May 18, 1954    W. W. McCAIN ET AL    2,678,748
MAILING MACHINE
Filed Nov. 10, 1950    13 Sheets-Sheet 5
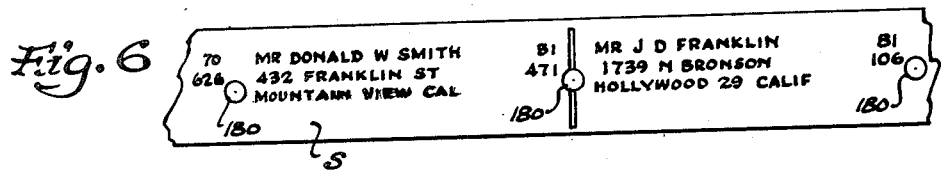
Fig. 6
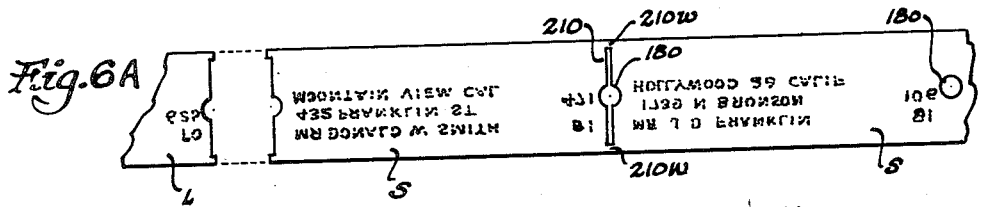
Fig. 6A
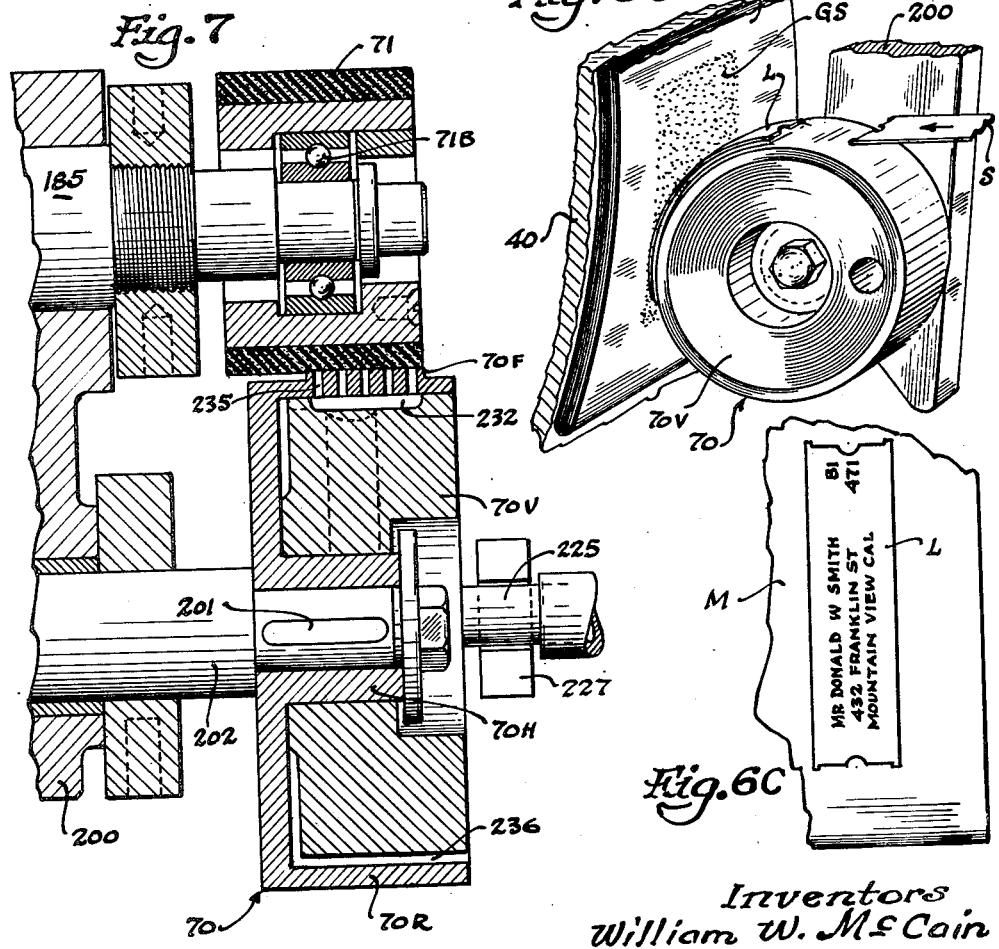
Inventors
William W. McCain
Chester E. Hillman
By Wallace and Cannon
Attorneys May 18, 1954   W. W. McCAIN ET AL   2,678,748
MAILING MACHINE
Filed Nov. 10, 1950   13 Sheets-Sheet 6
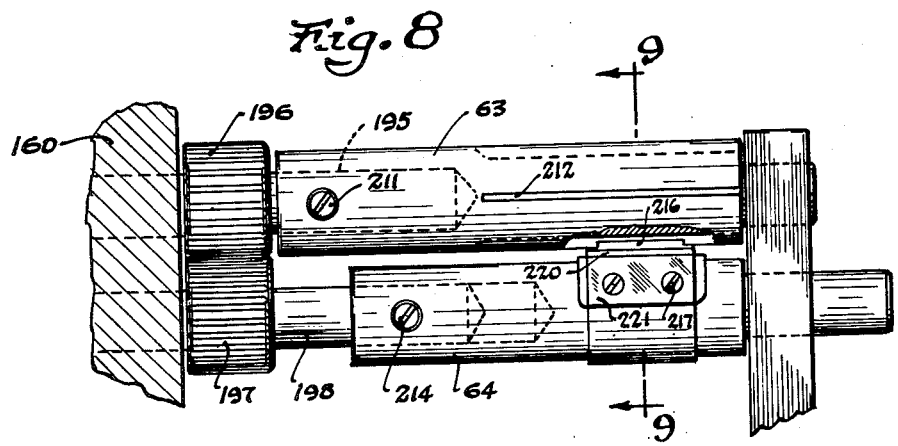
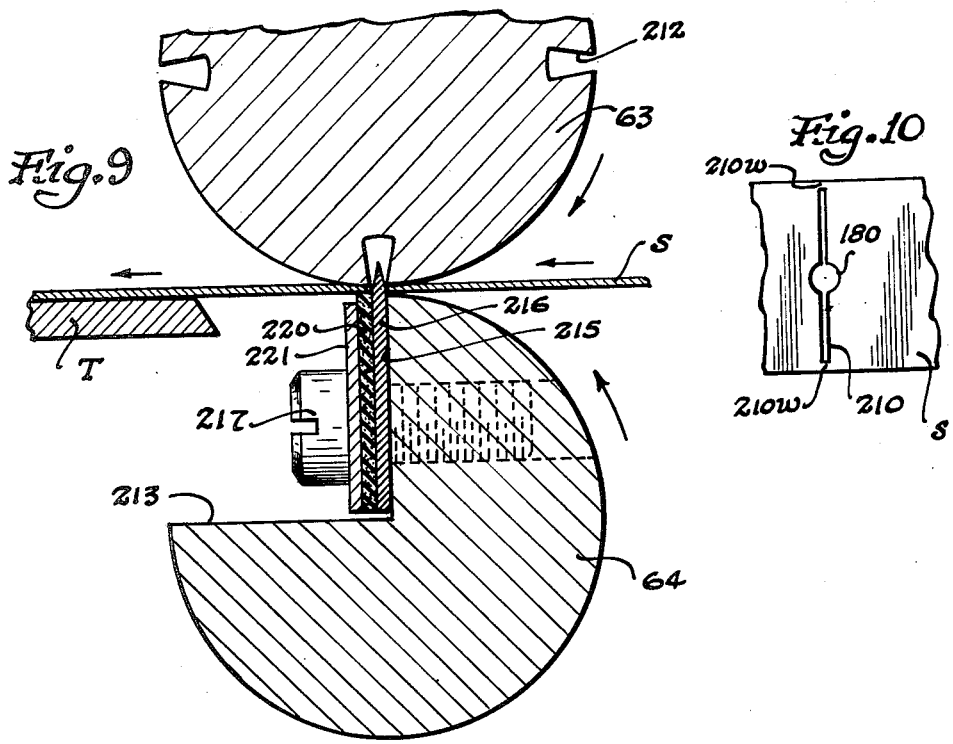
Inventors
William W. McCain
Chester E. Hillman
By Wallace and Cannon
Attorneys

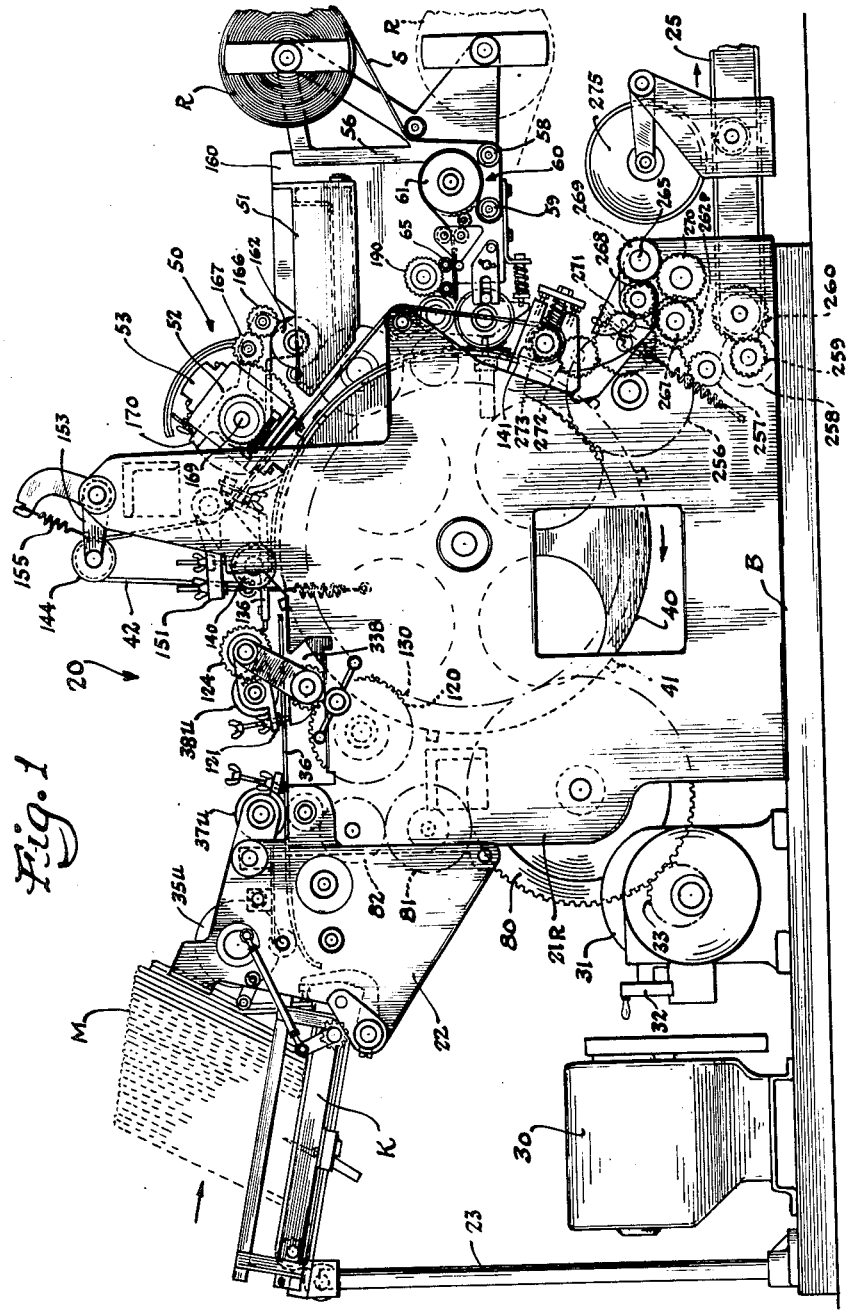

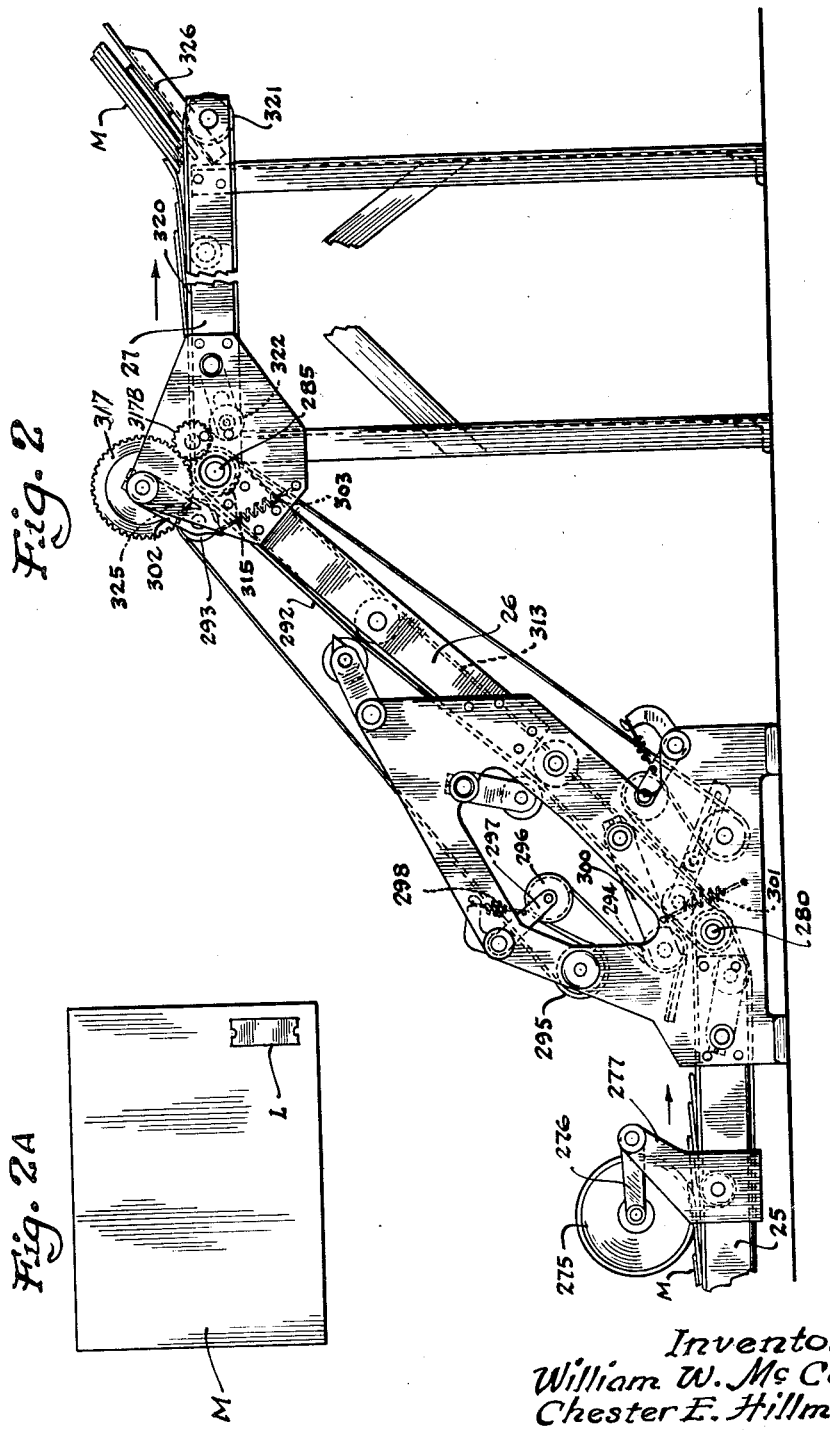

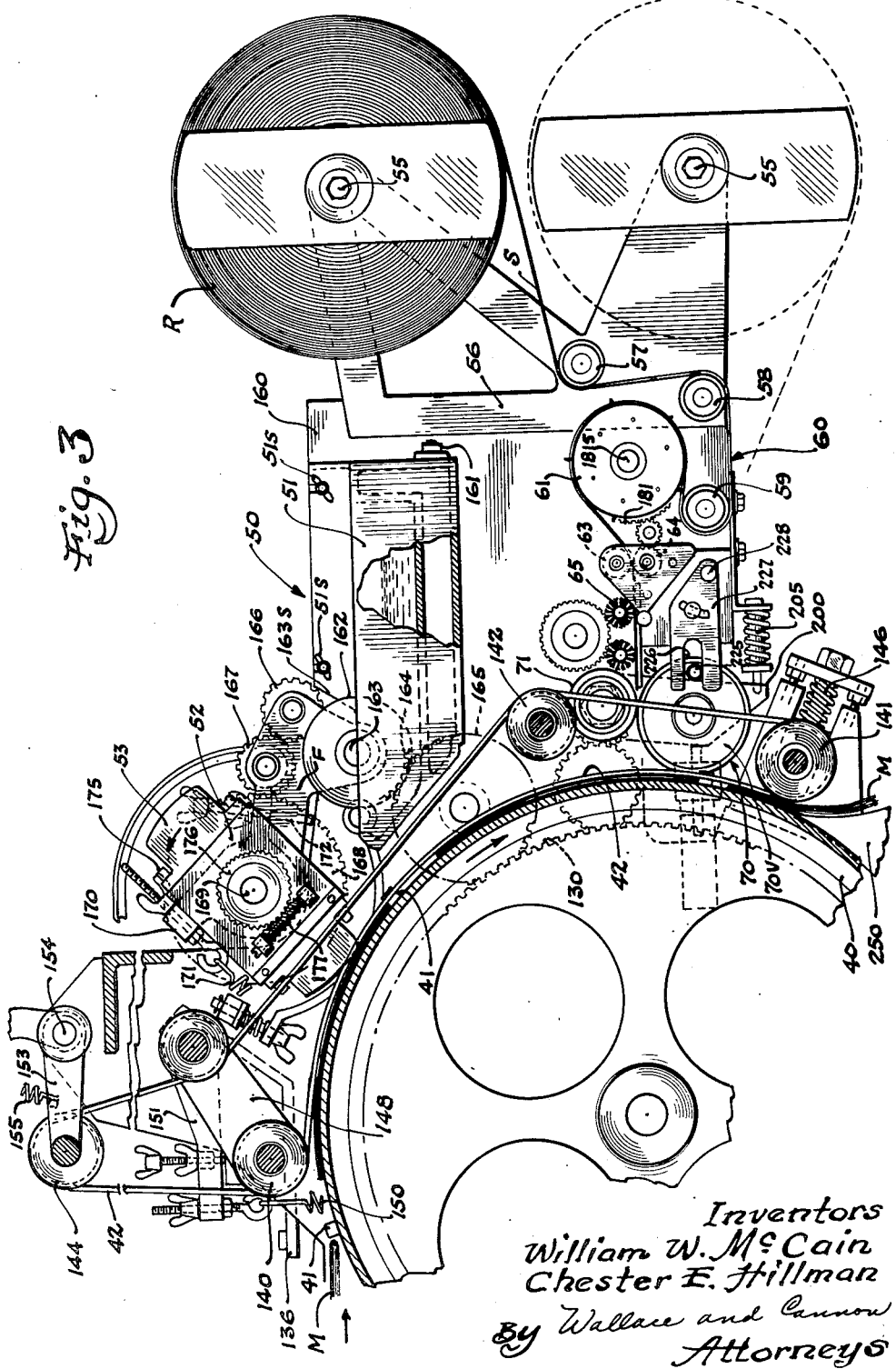

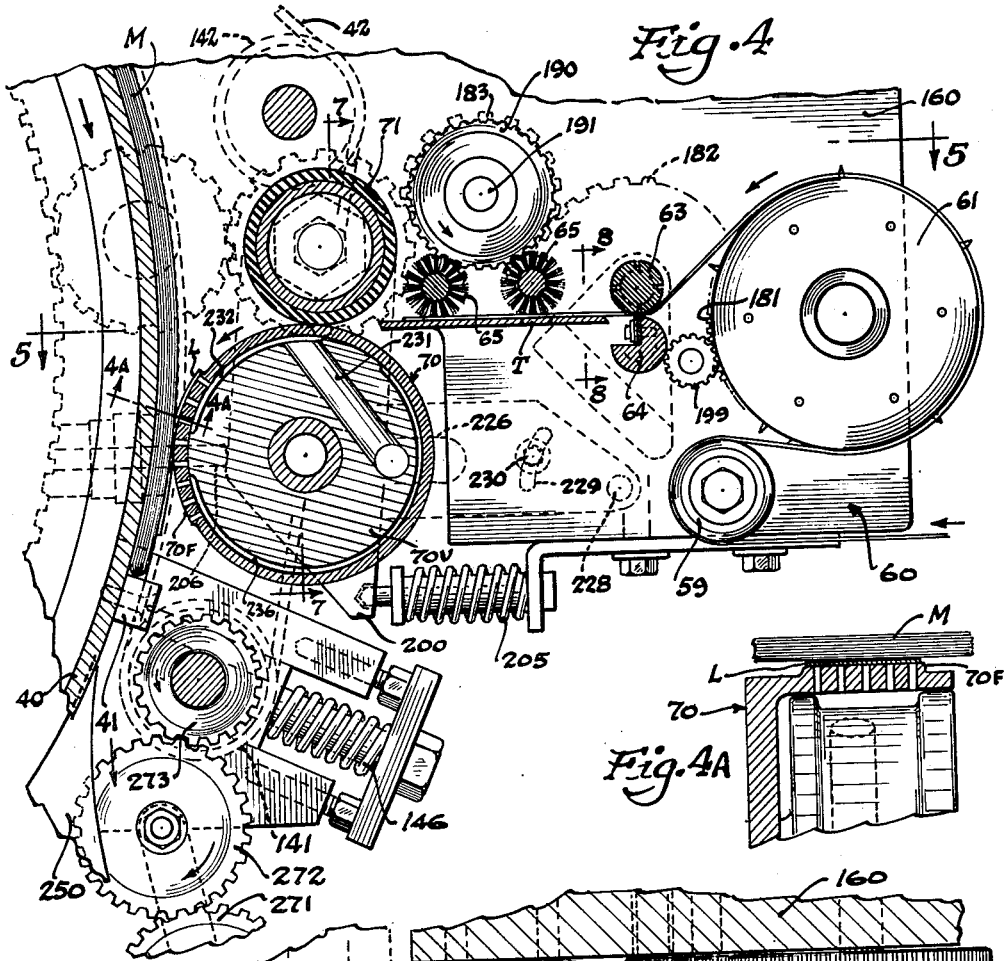
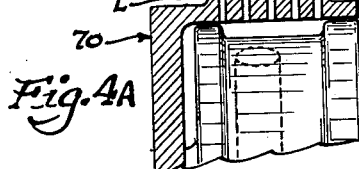
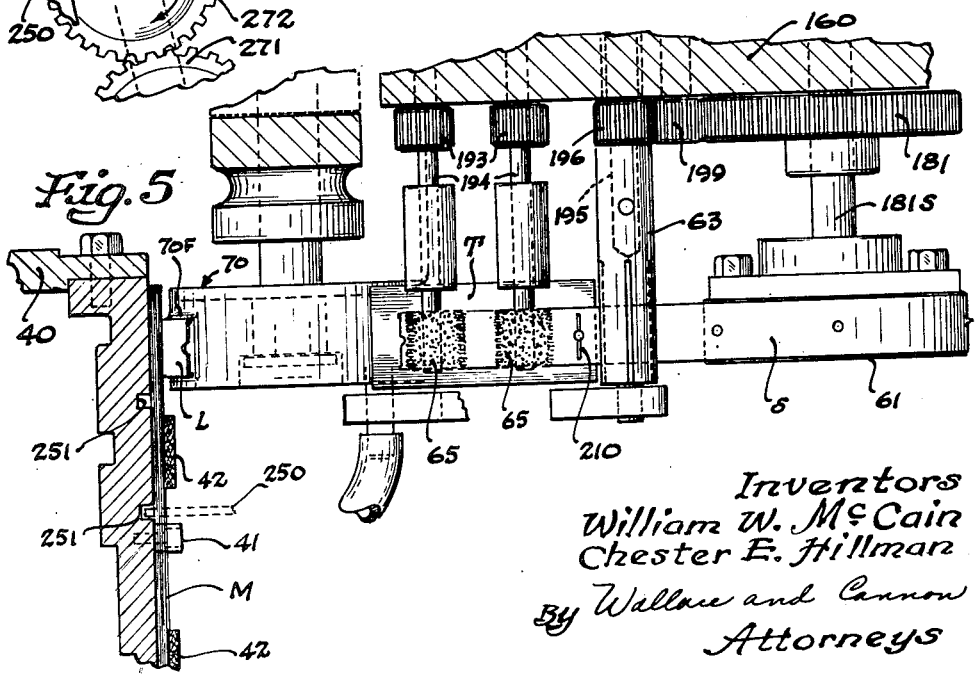

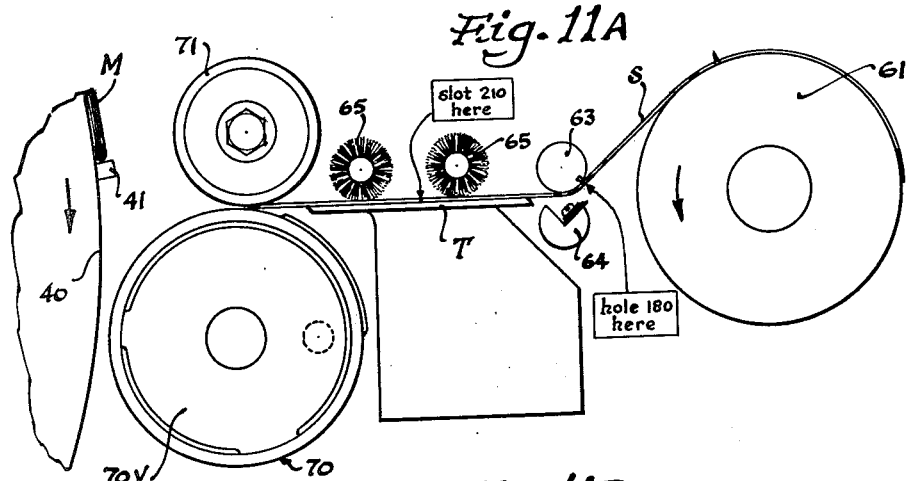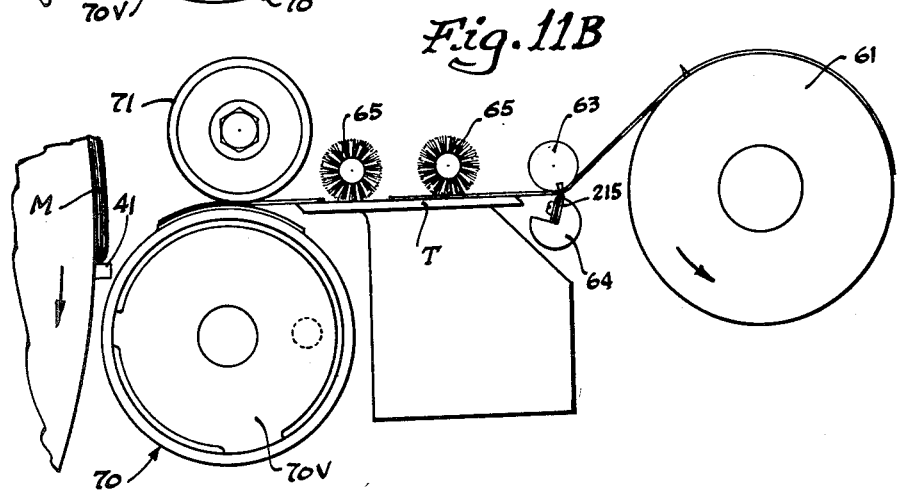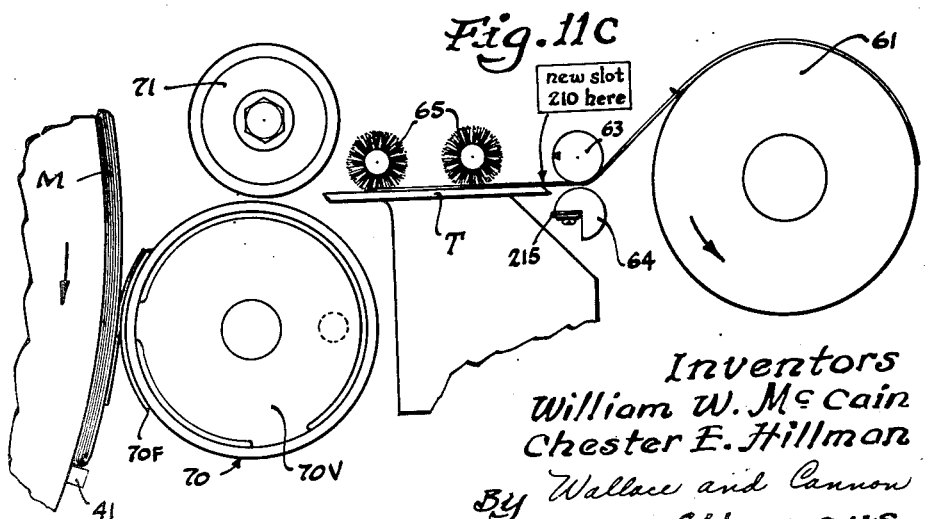

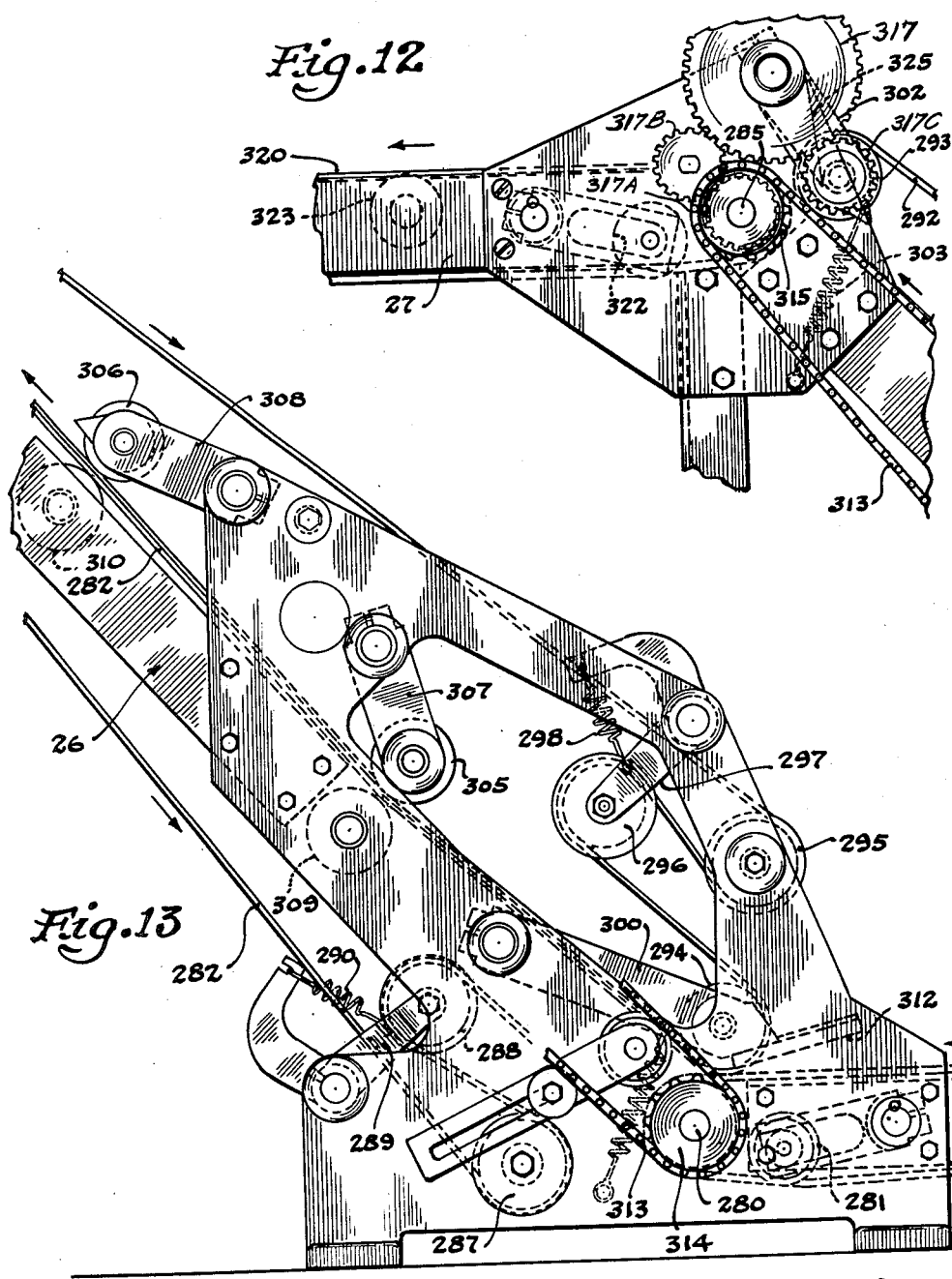

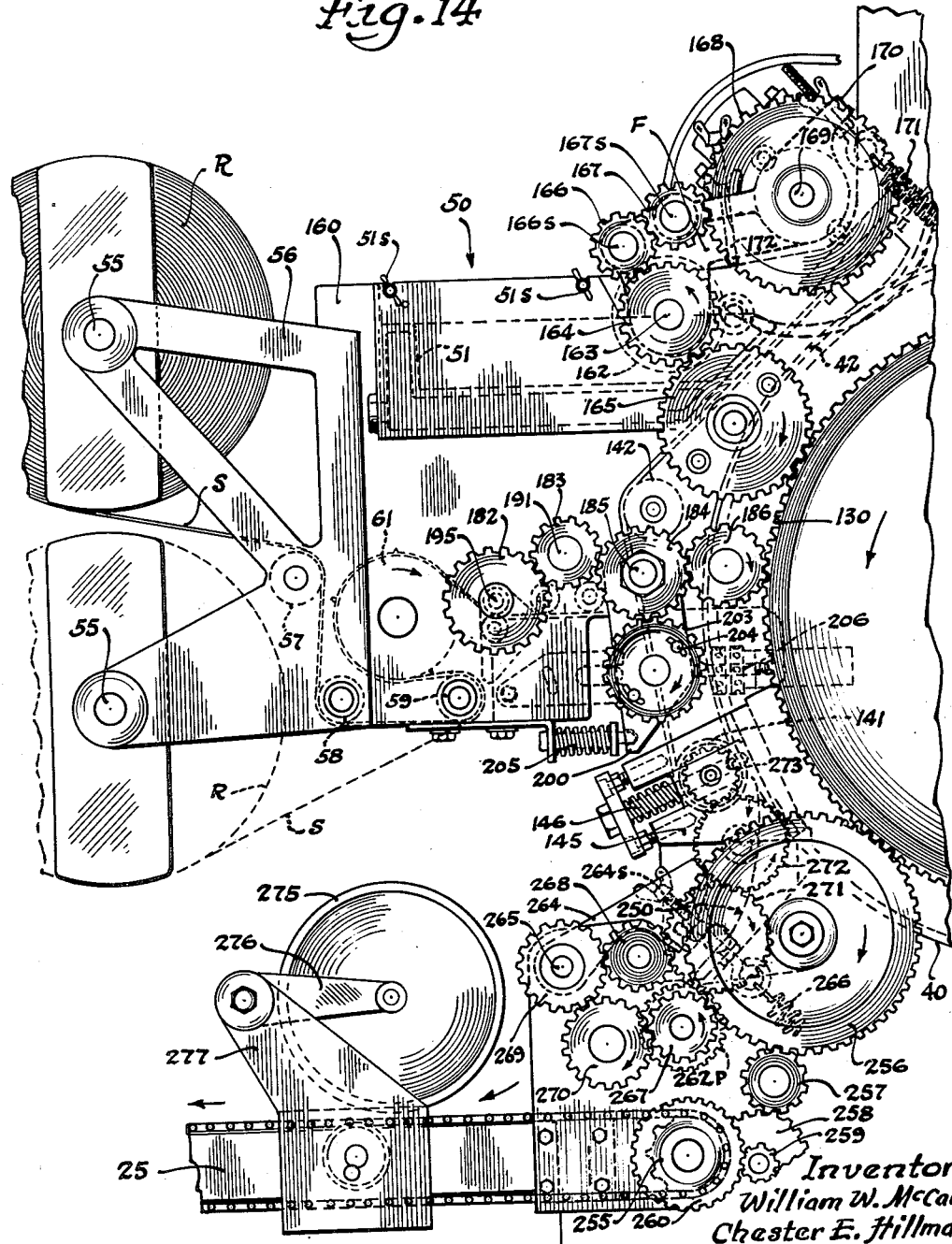

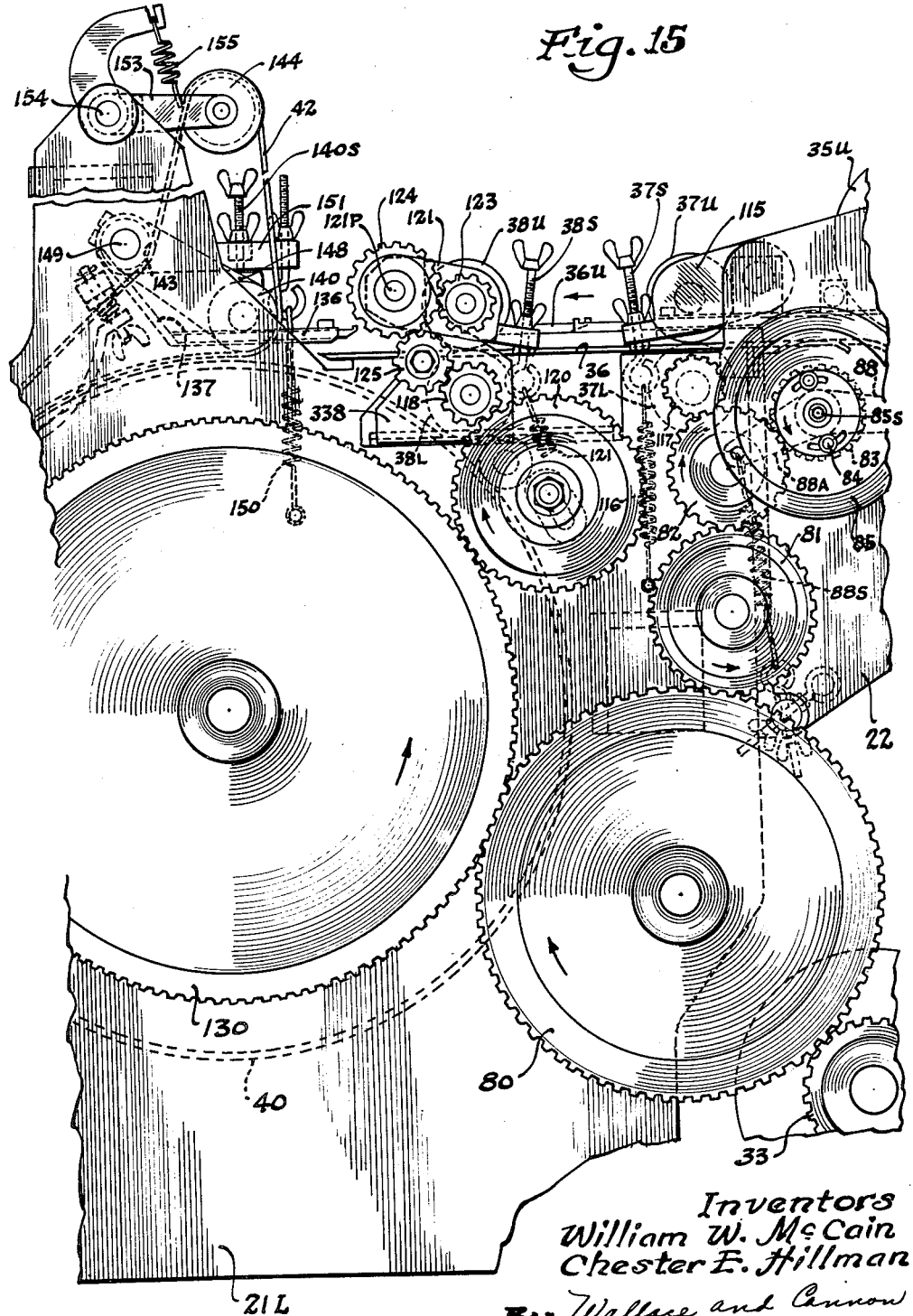

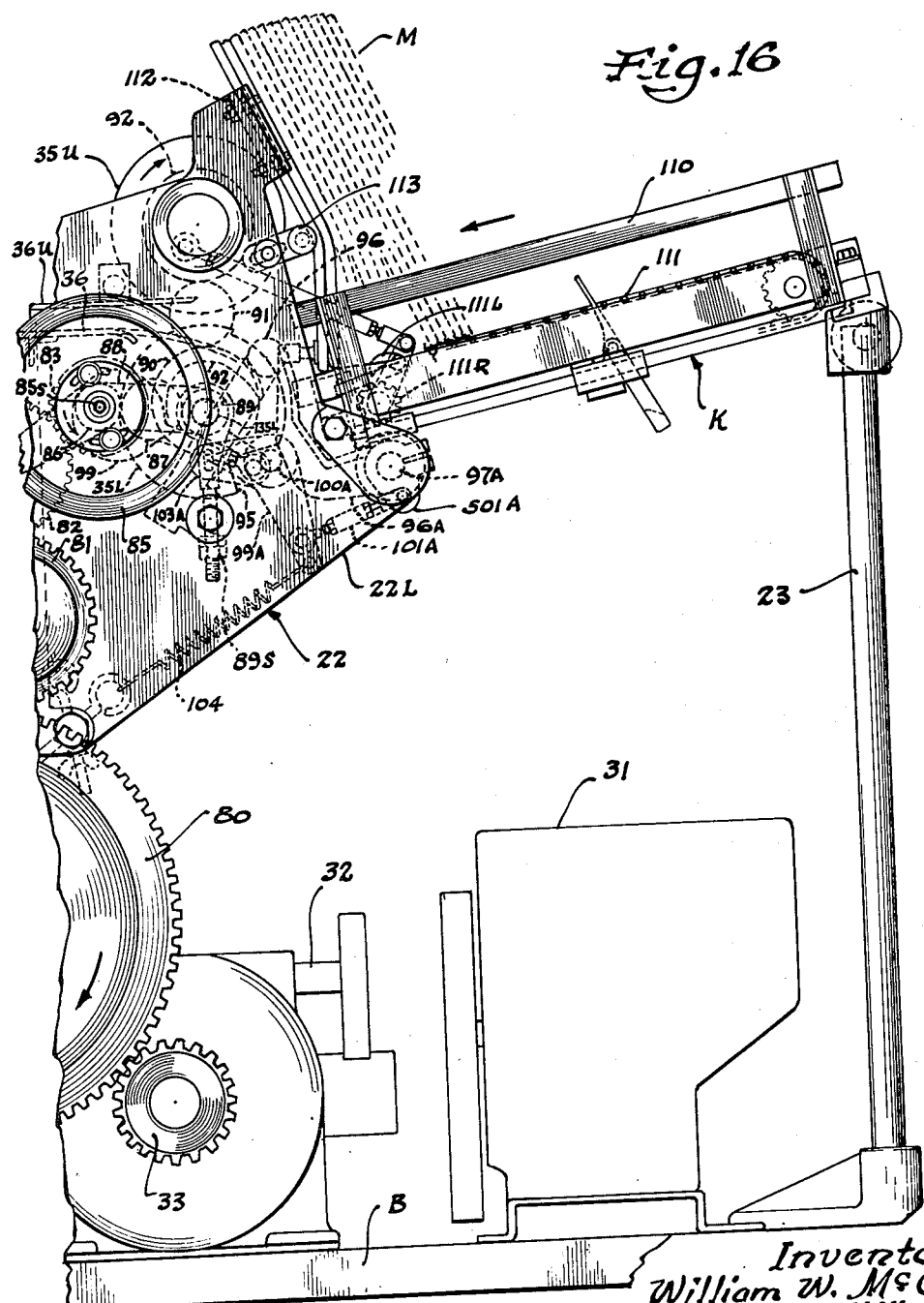

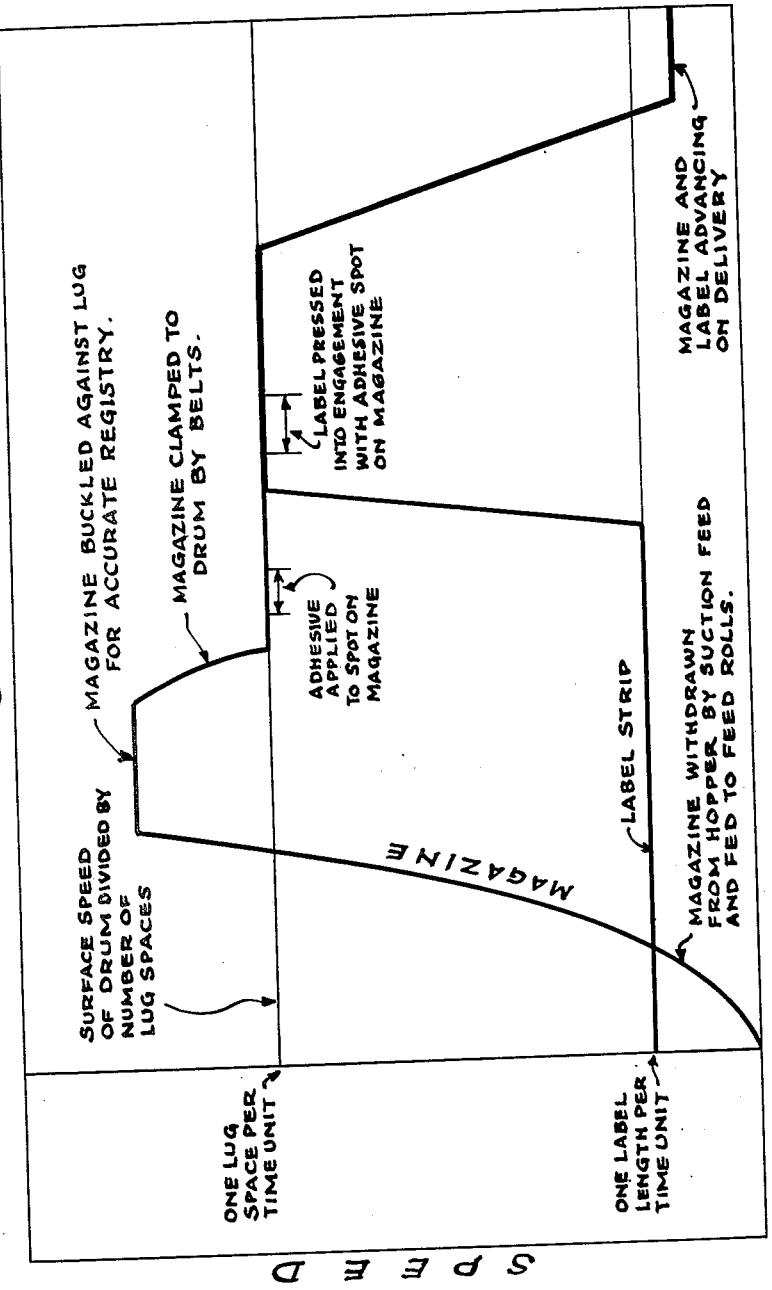

Patented May 18, 1954

2,678,748

UNITED STATES PATENT OFFICE 2,678,748

MAILING MACHINE

William W. McCain, Oak Park, and Chester E. Hillman, Park Ridge, Ill.; said Hillman assignor to said McCain Application November 10, 1950, Serial No. 194,994

26 Claims. (Cl. 216—33)

This invention relates to label affixing machines, and particularly to such machines adapted to function as mailing machines.

In the preparation of mailing pieces and particularly in the mailing of magazines, it is customary to prepare mailing strips which include a succession of printed addresses at spaced points along the length of such mailing strips, and these mailing strips are subsequently divided into labels that are affixed to the mailing pieces such as magazines. In accordance with prior practice, such labels have been affixed to the mailing pieces at a relatively slow rate, and in such a way that label affixing machines require frequent cleaning and readjustment. This, of course, involves substantial delay in the mailing operations and is thus objectionable and quite expensive. In prior machines used for affixing labels to mailing pieces, the operation has been such that most of the stoppages of the machine have occurred in such a way as to cause spoiling of several of the labels, and this, of course, necessitates the hand-addressing of mailing pieces to correspond with the labels that have thus been spoiled. This causes additional delay and expense, and is considered to be highly objectionable.

In view of the foregoing, it is the primary object of the present invention to simplify mailing and like operations so that the affixing of the mailing labels or the like may be carried on at an extremely rapid rate and in a way such that substantially continuous operation may be attained. More specifically, it is an object of the present invention to enable mailing labels and the like to be affixed in accurately located positions, this being particularly desirable in the labeling of magazines where the outside cover illustration is subject to disfigurement by improper location of the mailing label thereon.

In the affixing of mailing labels to magazines and the like, it has heretofore been found that objectionable scratching or marring of the cover of the magazine often results, and it is a further object of the present invention to enable mailing labels to be affixed to magazines and the like in such a way that the cover of the magazine is not marred or otherwise damaged. Another and related object is to enable this result to be attained at an extremely high production rate.

Where magazines or the like are to be labeled at a relatively high production rate, it is necessary that the individual articles be separated and moved through the apparatus at a high rate of speed, after which the speed of movement of the articles must be gradually reduced at the delivery end of the machine, and it is a further object of the present invention to simplify and facilitate the handling and movement of the magazines or the like and to accomplish this in such a way that each individual article is under complete and accurate control at all times during this movement, thereby to enable accuracy of label position to be maintained and at the same time to enable injury or damage to the magazines to be avoided.

In prior mailing or labeling machines of which we are aware, it has been the practice to accomplish the label affixing operation while the magazine or the like is held in a stationary or rest position in the machine, and this, of course, has resulted in an arrangement where it has been necessary to start and stop the movements of the magazines or the like at an intermediate point in the machine, and it is a further and important object of the present invention to enable the label affixing operation to take place while both the magazine and the label are moving through the machine at an extremely high rate of speed. Further and related objects of the present invention are to enable the mailing strip and each successive label as it is severed from such mailing strip to be accurately controlled as to position and speed of movement, and to enable the moving mailing strip and the severed label to be accurately coordinated with the movements of the magazines. Further objects are to enable labels to be affixed to magazines or the like by controlled application of the label to a previously applied glue spot or area on each magazine, and to enable such glue spot or area to be accurately applied in the desired location on each magazine while the magazine is moving at a high rate of speed through the machine.

It is a further object of the present invention to afford a mailing machine that is fully rotary in character and which is so constructed and arranged that the feeding of two mailing pieces or magazines at one time does not in any way interfere with the operation of the machine.

Other and further objects of the present invention will be apparent from the following description and claims and are illustrated in the accompanying drawings which, by way of illustration, show a preferred embodiment of the present invention and the principle thereof and what we now consider to be the best mode in which we have contemplated applying that principle. Other embodiments of the invention embodying the same or equivalent principle may be used and structural changes may be made as desired by those skilled in the art without departing from the present invention and the purview of the appended claims.

In the drawings:

Figs. 1 and 2, when taken together and in succession from left to right, constitute a side elevational view of a mailing machine embodying the features of the invention;

Fig. 2A is a face view of a magazine with a mailing label secured thereon;

Fig. 3 is a fragmentary view taken partially in vertical section and illustrating a portion of the machine shown in Figs. 1 and 2;

Fig. 4 is a fragmentary view taken partially in vertical section and showing further details of the label severing and applying means that are illustrated in Fig. 3;

Fig. 4A is a fragmentary sectional view taken substantially along the line 4A—4A of Fig. 4;

Fig. 5 is a sectional view of the structure shown in Fig. 4, the view being taken substantially along the line 5—5 of Fig. 4;

Fig. 6 is a face view of a portion of the mailing strip that may be severed into labels and applied to magazines in the machine of the present invention;

Fig. 6A is a view of the reverse side of the mailing strip shown in Fig. 6, the mailing strip as shown in Fig. 6A having the transverse severance slots formed therein, and the left-hand or leading label having been separated from the remainder or right-hand portion of the strip;

Fig. 6B is a fragmentary perspective view showing the relationship of the mailing strip, the leading or severed label, and the magazine to which such label is to be affixed;

Fig. 6C is a fragmentary elevational view of the label in its affixed position on a magazine;

Fig. 7 is a vertical sectional view taken substantially along the line 7—7 of Fig. 4 and showing further details of the label separating and applying rolls;

Fig. 8 is a view showing further details of the slot forming or cutting mechanism which conditions the mailing strip for the separation of the individual labels therefrom;

Fig. 9 is an enlarged vertical sectional view taken substantially along the line 9—9 of Fig. 8;

Fig. 10 is a fragmentary view of a portion of a mailing strip illustrating the details of the transverse slot that is cut in the mailing strip by the mechanism of Figs. 8 and 9;

Figs. 11A, 11B and 11C are diagrammatic views illustrating the progress of the magazine, the mailing strip and the severed label in the course of a label affixing operation;

Fig. 12 is a view of the discharge end portion of the delivery conveyor system;

Fig. 13 is a view of an intermediate portion of the delivery conveyor system;

Figs. 14 and 15 are views showing the gearing connections that are embodied in the machine;

Fig. 16 is a side elevational view of the suction feeder utilized in the machine;

Fig. 17 is a schematic timing diagram;

*The machine in general*

Figure 18:
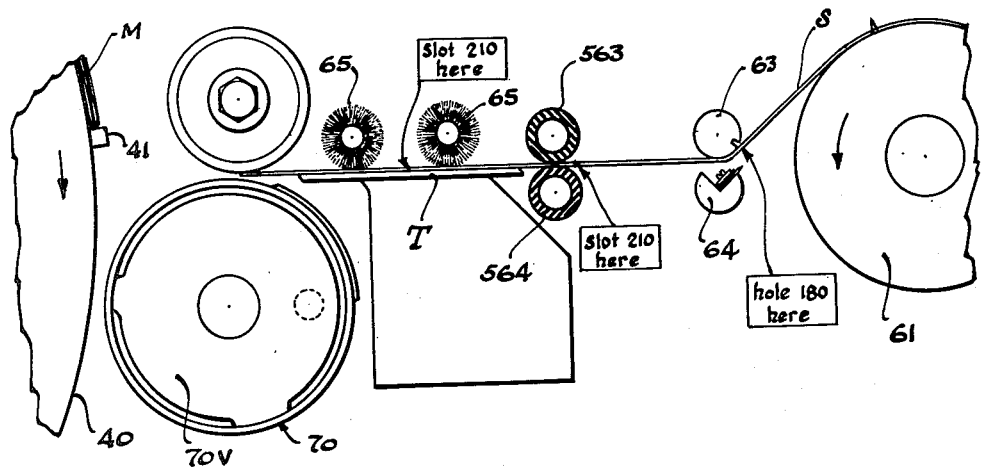
Fig. 18 is a diagrammatic view similar to Fig. 11A and showing an alternative construction.

For purposes of disclosure, the invention is herein illustrated as embodied in a mailing machine 20 that is illustrated in side elevation in Figs. 1 and 2, and in this machine a succession of magazines M of relatively large size, as indicated in Figs. 1 and 2A, are fed in succession through the machine, and while the magazines are in motion at a rapid rate in the machine, individual mailing labels L are separated from a mailing strip S, Fig. 6, and are affixed to the respective magazines in a location such as that illustrated in Fig. 2A, the magazines M then being discharged from the machine on a delivery mechanism which returns the magazines to a stacked relationship convenient for further handling.

The mailing machine 20 as herein shown is constructed so as to be sectional in form in that the delivery mechanism is arranged for direct floor mounting in association with the main frame of the label applying mechanism. Thus, as shown in Figs. 1 and 2, the main unit of the machine has a floor-mounted base B upon which a pair of side frames 21L and 21R are mounted, and to the left of these side frames, a magazine feeding and separating mechanism 22, including a supply hopper K, is mounted. The feeding and separating mechanism 22 has side frames 22L and 22R that are mounted on the frames 21L and 21R in a bracket-like relationship, and the supply magazine K extends to the left from the feeding and separating unit 22 and is supported at its left-hand end by a pair of upstanding columns 23 that are connected at their lower ends to the base B.

At the right-hand end of the base B, the machine has a horizontal delivery section 25 that extends for some distance to the right and which is arranged to feed the labeled magazine M to an elevating conveyor mechanism 26 which then discharges the magazines onto a final delivery table 27 where the magazines are returned to a stacked relationship.

The space on the base B and beneath the separating and feeding unit 22 and the magazine K is utilized for housing or containing a relatively large vacuum pump mechanism 30 and a drive unit 31, this drive unit in the present instance including a main motor and a variable speed output 32 which terminates in a drive gear 33 from which the various operating mechanisms of the machine are driven, as will hereinafter be described.

The magazines M that are supplied to the supply hopper K are separated one by one from the stack in the hopper K, and are fed with the bound edge of the magazine in a leading relation into position between a pair of driven feed rollers 35U and 35L that are located adjacent to the output end of the hopper K, and the magazine M is advanced by these feed rollers in substantially horizontal plane and along a series of laterally spaced horizontal supporting rails 36, and the progress of the magazine along the rails 36 is maintained at a relatively high rate by a first set of feed rollers 37U and 37L, the lower one of which is positively driven, and from this set of feed rollers, the magazine is discharged into position between a pair of feed rollers 38U and 38L, both of which are driven. The magazine M is then discharged into position on the periphery of a rapidly rotating and relatively large carrier drum 40, and is accurately located on the drum in a circumferential sense by engagement of the leading edge of the magazine with a transverse line of laterally spaced locating lugs 41 fixed on the periphery of the drum. As shown in the timing diagram of Fig. 17, the leading or bound edge of the magazine M is forced against the lugs 41 by being driven at a speed that is somewhat greater than the surface speed of the drum 40, and after the accurate registry has been assured by the resulting buckling of the magazine M against the lugs 41, the magazine M is clamped in position on the drum by a plurality of clamping belts 42 that are disposed in positions between the several lugs 41, and which extend about a relatively large arcuate portion of the drum 40. The magazines M move onto the drum 40 at substantially the upper point of the drum, and at this point, the belts 42 come into position over and about their guide rollers so as to hold the magazine M in position against the drum. The belts 42 extend downwardly along the surface of the drum for somewhat over 90 degrees, and it is within this arcuate zone that the label affixing operations are performed.

The mechanisms involved in such label affixing operations may vary, of course, with the characteristics of the label strip that is being handled, and in this connection it should be pointed out that while the label strip may take the more common form without adhesive of any kind carried thereon, it may also be made with an adhesive back-coating and this adhesive may be of the common water-soluble kind or may be either a pressure adhesive or a heat-applied adhesive. The machine 20 as shown in Figs. 1 to 17 may be employed to affix labels of the common or plain paper kind, or to affix labels that have a water-soluble adhesive back-coating, and by rendering one element of the machine inoperative or ineffective, the machine may be utilized to affix labels that carry a pressure adhesive back-coating. Finally, by affording a heat source at the label affixing station in the machine, the machine may be utilized for affixing labels carrying a heat-applied adhesive as a back-coating.

Before describing the specific way in which the belts 42 are mounted, and the way in which the drum 40 is mounted and driven, the other basic elements of the present machine will be described and located in a general way with respect to the drum 40. Thus, it will be observed in Figs. 1 and 3 that soon after the magazine has been clamped in position on the drum 40, the magazine is moved past a conditioning unit 50 which takes the form of a gluing unit 50 where common or plain paper labels are to be applied. It should be noted however that while the unit 50 is specifically described as a glue applying unit, it may serve as a moisture applying conditioning means where the label strip carries a water-soluble adhesive back-coating.

Thus the gluing unit 50 includes a glue supply tank 51 and a rotatable gluing head 52 that has spot-gluing segments 53 thereon, the gluing head 52 being driven in timed relation to the drum 40 so that the surface speed of the arcuate glue-applying segments 53 is the same as the surface speed of the drum 40. This unit 50 is thus effective to apply glue in a glue spot GS, Fig. 6B, to each magazine as the magazine is advancing rapidly in its clamped relationship with respect to the drum 40, and in the further advancing movement of the magazine M, and while it is still clamped to the drum 40, the label L is applied to the glue spot GS that has been provided on the magazine M by the gluing unit 50. Thus, at substantially the level of the axis of the drum 40, and relatively close to the lower end of the clamping belt structure 42, label separating and affixing means are provided. The mailing strip S is conventionally provided in the form of a roll R, and a pair of mounting axles 55 are provided on a mounting bracket 56 whereby two rolls R of mailing strips may be mounted so that one roll is held in reserve to be started after a first roll has been exhausted. The mailing strip S is led over a roller 57 and then downwardly and about a guide roller 58, and then to the left and upwardly and about a guide roller 59 which is mounted as a part of the label feeding and separating unit 60. This unit includes a feeding pin wheel 61 about which the strip S is led from the guide roller 59, and the strip is then fed between a pair of feeding and slotting rolls 63 and 64, which will be described in some detail hereinafter. This set of rolls 63 and 64 serves to provide a weakened line of severance between adjacent labels L, and from these two rolls 63 and 64, the strip is fed along a supporting shelf or table T beneath a pair of brush-like feeding members 65. These members 65 advance the strip to the left and into position to be grasped at the proper time in the cycle of the machine between a lower affixing roller 70 and an upper pressure roller 71. The roller 70 includes a segmental gripping face 70F which cooperates with the roller 71 to positively grip the leading end portion of the strip S and to advance the same at a speed faster than the speed of the strip S, thereby to separate the label L that constitutes the leading end portion of the strip from the balance of the strip, and after such separation, this leading label L is held in place on the gripping portion 70F by suction, as will hereinafter be explained, and is pressed against the glue spot GS on the magazine M, so as to thereby be secured to the magazine. The magazine M then advances downwardly, and after it passes beyond the lower end of the clamping belts 42, the magazine is stripped from the drum 40 and is discharged onto the horizontal conveyor section 25.

*The sheet feeder 22*

The sheet feeder 22 is, in most of its elements, old and well known in the art, and, as herein shown, includes the feed rolls 35U and 35L. These feed rolls are supported between the end plates 22R and 22L that are parallel to the end plates 21R and 21L, and these feed rolls are driven from the main drive gear 33. Thus, the main drive gear 33 is meshed with a relatively large transmitting gear 80 that is mounted in the main frame of the machine, and the drive for the elements of the sheet feeder 22 is taken from the gear 80 by means including a relatively small gear 81 that is mounted in the unit 22 on the outer face of the side frame 21L, as shown in Figs. 15 and 16. This gear 81 has a pinion 82 meshed therewith which is in turn meshed with a gear 83 that is adjustably fixed by bolt and slot connections 84 on the outer face of a hand wheel 85. This hand wheel 85 is fixedly mounted on a shaft 85S, and it is from the shaft 85S that drive is obtained for the feed rolls 35U and 35L. The feed roll 35L is afforded by two separate mutilated disks that are spaced from each other and are carried on in dependent but aligned stub shafts 135L, and drive is transmitted to the two shafts 135L by means of similar gears 86 fixed on the shaft 85S near opposite ends thereof. Thus each gear 86 is meshed with a corresponding gear 87 that is carried as an intermediate gear on a rocking frame 88 pivoted on the shaft 85S, two such rocking frames 88 being provided, and each gear 87 being meshed with a corresponding gear 89 on the shaft of the related feed roll 35L. This serves to drive the lower feed rolls or disks 35L in unison and in a counter-clockwise direction as viewed in Fig. 16. A similar but reverse driving action is attained for the feed roll 35U by means of a gear 90 meshed with the gear 83, an intermediate or idler pinion 91 and a gear 92 fixed on the feed roll 35U. The upper feed roll 35U is in the present case disposed on a fixed axis, while the lower feed roll 35L may be forced downwardly, in case of a double feed. This is made possible by the rocking frame 88 which is urged upwardly or in a counter-clockwise direction by a spring 88S acting on an arm 88A that is rigid with the frame 88. Such upward movement of the roll 35L is adjustably limited by an adjustable stop mechanism 89S, Fig. 16.

The gear 90 is arranged to drive a cam 92 located on the axis of the roll 35L and which controls, in part, the operation of the suction feeder, as will be described presently. The action of the present feeder is dependent in part upon the formation of notches 95 in the disks that form the lower feed roll 35L, these notches 95 cooperating with a plurality of rocking retaining arms 96A which are mounted on a rocking axis 97A, as shown in Fig. 16, and with a plurality of suction arms 96 that are pivoted on an axis 97. The lower feed roll 35L, being formed as a pair of spaced disks on independent shafts, affords working space for the rocking suction arms 96 which move into the space between the independent or spaced disks of the feed roll 35L. The rocking movement for the retaining arms 96A is provided by a rocking frame 99A that is pivoted in the machine frame at 100A. This rocking structure 99A is connected by an adjustable link 101A to an arm 501A that is clamped to the shaft 97A so as to extend downwardly therefrom, and the rocking structure 99A has a cam roller 103A thereon which engages the cam 92. A spring 104 urges this rocking structure 99A in a clockwise direction, thus to maintain the roller 103A against the cam 92. In the operation of the machine, the retaining arms 96A are rocked in a counter-clockwise direction from the position shown in Fig. 16, into out-of-the-way positions so that the suction arms 96 may withdraw a magazine M, and after such withdrawal, the arms 96A return to their effective or retaining positions. The suction arms 96 are then rocked in a counter-clockwise direction by means of an eccentric strap pivoted to the arms 96 and encircling an eccentric 99 fixed on the shaft 85S.

The suction arms 96 are thus rocked so as to withdraw the forward one of the magazines M toward the bight between the feed rolls 35U and 35L. In this movement, the timing is such that the lower edge of the magazine M is moved into the notch 95 in the lower feed roll 35L, and the trailing edge of this notch is thus effective to impart a further bending action to the magazine M, and the magazine is thus forced into engagement with the lower edge of the feed roll 35U. This causes the magazine M to be gripped between the two feed rolls so as to thereby be pulled forwardly at a rapid rate.

The hopper K in which the magazines M are placed is formed so that side rails 110 are provided, and the bottom of the magazine is afforded by a plurality of feed chains 111. The magazines M rest on the upper run of the feed chains 111, and the chains 111 are actuated in a feeding direction in each operation of the feed mechanism by means of ratchet mechanism 111R that is driven by means including a link 111L that is eccentrically connected to the shaft of the upper feed roll 35U. Thus the forward or leading one of the magazines M in the hopper K rests at its lower end on the feed chains 111, and its upper leading face rests against a transverse support bar 112. Below the support bar 112, a transverse roller 113 is provided, and the bending action upon the magazines M takes place about the roller 113. This roller also simplifies the withdrawing movement of the magazine from the hopper in that it facilitates downward withdrawing movement of the leading magazine by the suction arms 96, as well as by the feed rolls 35U and 35L.

As the magazine is gripped between the feed rolls 35U and 35L, it is drawn into the opening between the lower guide rails 36 and upper or hold-down rails 36U, and the forward or advancing movement of the magazine M by the rolls 35U and 35L forces the leading or bound edge of the magazine M into the bight between the feed rolls 37U and 37L.

The feed roll 37L is mounted on a stationary axis between the frame plates 21R and 21L of the machine, and the upper feed roll 37U is mounted between swinging arms 115 which are urged downwardly by means including an adjustable spring element 116. The extent of downward movement of the roll 37U may be limited by an adjustable stop 37S. The lower feed roll 35L is driven from the gear 82, a pinion 117 being fixed on the shaft of the feed roll 35L and being meshed with the gear 82. Thus, the roller 37L is positively driven and acts on the magazine M by virtue of the downward pressure of the shiftably mounted upper feed roll 35U.

As the magazine is advanced by the feed rolls 37L and 37U, it is forced into the bight between the feed rolls 38U and 38L, these feed rolls being mounted on an adjustably settable carrier or mounting block 338 that may be set in different positions along the feed path so that the feed rolls 38 may be set to release the trailing edge of a magazine at substantially the time when the leading edge thereof has been gripped between the drum and the belts 42. The mounting block 338 is carried on the main frame of the machine. The lower feed roll 38L is mounted in the block 338 and has a pinion 118 fixed thereon and meshed with a gear 120 that is driven in a manner to be described presently. The upper feed roll 38U is mounted in a swinging frame 121 that is pivoted at 121P on the block 338 and is urged downwardly by adjustable spring means 121S, and the extent of this downward movement may be limited by an adjustable stop 38S. The feed roll 38U has a pinion 123 thereon that is meshed with a gear 124 located on the axis 121P of the swinging frame 121. An intermediate pinion 125 is meshed between the gears 118 and 124, thus to impart the desired drive to the upper feed roll 38U.

The drive for the feed rolls 38U and 38L is taken from a gear 130 with which the gear 120 is meshed, and the gear 130 is meshed with the gear 80 and is fixed to the drum 40 so as to serve as a driving means for the drum. The gear 120 is mounted on the side frame 21L by means of a mounting stud 120P, and this stud is adjustable in an arcuate slot 120S so that the gears 130, 120 and 118 may be properly meshed in any set position of the adjustable block 338.

As the magazines are discharged from the feed rolls 38U and 38L, they move along the lower guide rails 36 and into position beneath a plurality of upper guide rails 136 that are carried on a mounting plate 137 so as to extend to the right as shown in Fig. 15 between the locations of the clamping belts 42. The magazines are thus guided into position in the bight between the belts 42 and the drum 40, and, as hereinabove pointed out, the timing is such that the leading edge of each magazine strikes a set of lugs 41 and is driven at a rate faster than the lug 41 so as to be accurately engaged with these lugs prior to the time when the clamping action of the belts 42 becomes effective.

The belts 42 are so mounted as to be yieldingly urged at all times toward the periphery of the drum 40 in the arcuate working zone thereof, and these belts are driven in timed relation to the drum 40 as will be hereinafter described. Thus, it will be observed in Figs. 1, 14 and 15 that the effective or clamping runs of the belts 40 extend between sets of upper rolls 140 and lower rolls 141. The outer or return run of the belt extends from the lower rolls 141 about a set of idler rolls 142 and beneath a set of idler rolls 143, and then upwardly about a set of tensioning rolls 144, the belts then extending downwardly and beneath the rolls 140.

The lower rolls 141 are mounted on a frame 145 with a spring tensioned device 146 urging these rolls radially toward the surface of the drum 40. This device includes a stop bolt 146S which is threaded into the roll shaft so as to limit inward movement of the rolls 141 to an amount determined by the thickness of the magazines that are to be passed through the machine. A similar action is attained in respect to the rolls 140 by supporting these rolls on a rocking frame 148 that is pivoted at 149 on the axis of the rolls 143, and an adjustable spring tensioning device 150 acts on the shaft 149 through an operating arm 151 so as to urge the rocking frame 148 and the rolls 140 toward the surface of the drum 40. The normal spacing between the belts 42 and the drum 40 is determined by the thickness of the magazines being labeled, and is governed by adjustable stops 140S. The plate 137 and the upper guide bars 136 are carried on the shaft 149, so that the position of the guide bars 136 is also governed by the setting of the stop 140S.

The tensioning rolls 144 are mounted on a rocking structure 153 that is pivoted at 154 in the machine frame, as shown in Fig. 15, and tensioning springs 155 are effective on the rocking frame 153 to urge the rollers 144 in an upward or tensioning direction, thereby to maintain the belts 42 under the proper tension at all times. With this arrangement, the clamping runs of the belts 42 are effectually engaged with magazines of different thicknesses so as to hold the same in their accurately indexed positions on the drum 40 during the passage of such magazines through the working zone of the machine. Moreover, the feeding of two magazines at a time will not disrupt operation of the machine.

*The glue applying unit 50*

The glue applying unit 50 has the glue supply tank mounted on one face of a vertical mounting plate 160 which forms an integral part of the rear side frame 21L, and this supply tank is arranged to be heated through the provision of an electrical heating unit 161 in its lower or bottom wall. Within the tank and running in the supply of glue that is contained therein, a fountain roll 162 is provided, and this fountain roll is constantly rotated and is so located that it will be engaged by the glue segments 53 in each rotation of the glue applying head 52.

The glue tank 51 is constructed so as to be removable from the machine, and to this end is supported on the forward face of the wall 160 by means including screw fasteners 51S. The moving glue-handling and applying parts, that is, the fountain roll 162 and the glue head 52, are also constructed as a removable unit. Thus, as shown in Figs. 1, 3 and 14, the fountain roll 162 is fixed on a shaft 163 which is mounted in a frame F that may be put in place on the forward side of the wall 160 at the upper edge thereof. The projecting rear end of the mounting shaft 163 is arranged for movement into a slot 163S formed in the upper edge of the wall 160, and on the rear or opposite side of the wall 160 the shaft 163 has a gear 164 fixed thereto. This gear 164 is meshed with a gear 165 that is mounted on the wall 160 and meshed with the gear 130 of the drum 40. The glue head 52 is driven from the gear 164 by gears 166 and 167 that are meshed with each other, and the gear 166 of which is meshed with the gear 164. The gear 167 is meshed with a relatively large gear 168 that is fixed on the mounting shaft 169 of the glue head 52 so that the glue head 52 is rotated in positively timed relationship with the drum 40. The gears 166 and 167 are mounted on shafts 166S and 167S respectively that are mounted in the frame F, and the shaft 169 which carries the glue head 52 is also mounted in the frame F. The frame F and all of the elements carried thereby may be pivoted about the axis of the shaft 163. Thus, the glue head 52 may be moved away from the drum 40, as in the case of a double feed. The swinging frame F is, however, urged in a clockwise direction, Fig. 14, by a spring 171, such movement being limited by an adjustable stop 172 which determines the normal position of the glue head 52 in accordance with the thickness of the magazine that is to be labeled.

The head 52 as embodied in the present machine is square in its cross-sectional form, and has the glue-applying segments secured on parallel opposite faces thereof by means including cap screws 175. It is important, of course, to have the glue spot GS accurately located with respect to the leading edge of the magazine end, and to enable this to be accomplished, means are afforded for accurately adjusting the head 52 rotatably with respect to the shaft 169. This is accomplished by affording a worm gear 176 that is keyed to the shaft 169, and a worm 177 is mounted on the block or head 52 so as to be meshed with the work wheel 176. Thus, by rotative adjustment of the worm 177, the head 52 may be accurately and readily adjusted in a rotative sense with respect to the shaft 169.

*The feeding means for the strip S*

The timed feeding of the strip S is accomplished by means including the pin wheel 61 which is positively driven from the gear 130 of the drum 40, and it should be observed that the mailing strip S has perforations 180 formed therein, as shown in Fig. 6, intermediate the adjacent portions that are to afford the individual labels L. The pin wheel 61 has a driving gear 181 fixed on its supporting shaft 181S, as shown in Fig. 5 of the drawings, this shaft being located on what may be termed the forward side of the vertical supporting plate 160. On the other or rear side of the plate 160, a drive connection is afforded for the pin wheel 61, as will be described in some detail hereinafter. This drive includes a gear 182, and the gear 182 is in turn meshed with a gear 183, the axis of which is located above and midway between the axes of the feeding brushes 65, for purposes that will appear hereinafter. A gear 184 is meshed with the gear 183, and this gear is rotatably mounted on a stationary shaft 185 that constitutes the supporting shaft for the pressure roll 71. It should be noted in this regard that the roll 71, which is rubber covered as shown in Fig. 7, is supported for free rotation on the forward outboard end of the shaft 185 by means of a ball bearing 71B. Between the gear 184 and the gear 130, a drive gear 186 is mounted, as shown in Fig. 14, so that the gears 186, 184, 183 and 182 are driven from the drum 40 and in timed relation thereto.

The gear 183 is located on what may be termed the rear face of the vertical standard or plate 160, and on the other or forward side of this plate, a gear 190 is fixed to the shaft 191, which also carries the gear 183. The gear 190 is located above and is meshed with pinions 193 that are fixed on the shafts 194, which carry the feeding brushes 65, and hence, these feeding brushes are driven in the same direction at all times and at a surface speed which is greater than the surface speed of the pin wheel 61.

The gear 182 is fixed on a shaft 195 that carries the upper slotting roll 63, and on the forward side of the vertical plate 160, a gear 196 is fixed on the shaft 195. This gear meshes with a gear 197 that is fixed on the shaft 198 that carries the lower slotting roll 64, so that the rolls 63 and 64 are driven in timed relation and in opposite directions. The gear 197 serves to drive the gear 181, which is connected to the pin wheel 61, this being accomplished by an intermediate pinion 199 that is meshed with the gears 197 and 181.

The gear 184 serves to drive the suction wheel 70, and this suction wheel 70 is so mounted that it may be resiliently pressed toward the adjacent face of the drum 40 at all times. Thus, a supporting arm 200 is pivoted at its upper end on the shaft 185, as will be evident in Figs. 3, 4, 7 and 14, and the suction wheel 70 is keyed at 201 on the forward end of the shaft 202 that is rotatably supported in the lower portion of the arm 200 and in parallel relation to the shaft 185. The shaft 202 has a gear 203 fixed thereon in a rotatably adjustable relationship by means including clamp screws 204, and this gear 203 is meshed with the gear 184 so that the suction wheel 70 is driven in timed relation to the drum 40.

The lower end of the arm 200 is constantly urged in an inward direction or toward the periphery of the drum 40 by means of an expansion spring unit 205, and such inward movement of the arm 200 and the suction roll 70 is governed by an adjustable stop mechanism 206 that is carried on the machine frame and which lies in the path of the lower end portion of the arm 200 at substantially the level of the shaft 202.

The slotting means

After the mailing strip S has left the pin wheel 61, it moves between the rolls 63 and 64, which embody a transverse slotting means that is effective to extend transverse slots 210 from opposite sides of each perforation 180, thus to condition the labels for quick and easy separation from the strip S when the leading label is effectually engaged between the rolls 70 and 71. The slotting mechanism is shown in the same detail in Figs. 7 and 9 of the drawings. Thus, the upper roll 63 is cylindrical in its general form and has a mounting recess in its rear end whereby it may be fixed with the aid of a set screw 211 to the projecting forward end of the shaft 195. Forwardly of the forward portion of the shaft 195, the roll 63 is formed with longitudinal slots 212 therein, such slots being substantially dovetail in form so as to be relatively narrow at their outer edge and so as to be defined by relatively sharp corners where the sides of the slot meet the peripheral surface of the roll 63. It should be observed that only one of the slots 212 functions at any particular time, the roll 63 being shown in the present instance with four slots disposed about the periphery of the roll at a 90 degree spacing, thus enabling the roll to be reset on the shaft 195 after any particular one of the slots 212 has become unduly worn.

The slots 212 are arranged to cooperate with slotting means afforded on the lower roll 64, and in affording such a slotting means, the lower roll has a 90 degree cutaway portion or notch 213 formed along the portion of its length. The roll 64 is cylindrical in form and has a recess in its rear end whereby it may be secured with the aid of a set screw 214 to the projecting end of the shaft 198.

The notch 213 affords a mounting shoulder 215 that is substantially radial in respect to the axis of the roll 64, and against this shoulder 215 a slotting knife 216 is secured by means including cap screws 217. The slotting knife 216 has a pointed upper edge shaped so that in the rotation of the rolls 63 and 64 it may enter the cooperating slot 212. In attaining the slotting action, the roll 64 is provided with a resilient holding member 220 in the form of a rubber plate which is clamped against the exposed or lefthand face of the knife 216 by means of a clamping plate 221. The function of the resilient clamping or holding element 220 is to afford a gripping action which presses the strip S against the roll 63 at the leading edge of the slot 212. This causes the strip S to be tensioned across the slot 212 between the pin wheel 61 and the rubber strip 220, such tensioning being effective at the time when the knife 216 is to pierce the strip. This enables the proper slotting operation to take place in the course of rotation of the rolls 63 and 64.

The suction valve of the roll 70

As hereinabove pointed out, the separating action that is applied to the leading label L is effected by clamping the label between the rolls 70 and 71, and practically as soon as this separating action takes place, suction is applied throughout the area of the raised portion 70F so as to hold the label in position as it advances toward the label affixing position. This suction is released progressively as the affixing operation takes place, and the control of the suction is attained by valve means that are located within the roll 70. Thus, as is best shown in Fig. 7 of the drawings, the roll 70 is internally recessed from its outboard end so as to afford an internal central hub 70H and an outer rim 70R. Within this recess and supported on the hub 70H, a valve member 70V is provided, this valve member being held in a non-rotative relationship by means including a rigid suction pipe 225 that extends outwardly from the outer face of the valve member 70V, and in an eccentric location, as will be evident in Fig. 3 of the drawings. The suction pipe 225 is arranged to pass through a slot 226 that is formed in an adjustment plate 227. This adjustment plate is pivoted at 228, and has an arcuate slot 229 formed therein and centered on the axis of the mounting pivot 228. A clamping bolt 230 extends through the slot 229 so that by clamping the bolt 230, the plate 227 may be secured in any desired position. This adjustment of the plate 227 serves to adjust the rotative position of the valve member 70V within the rim 70R. The suction pipe 225 is connected by an internal bore 231 to an arcuate groove 232 that is formed in the upper left-hand portion of the valve member 70V, as will be evident in Figs. 4 and 7. This slot 232 extends from a point that is located directly beneath the axis of the roller 71, and to the left and downwardly to a point just above the point of contact of the roller 70 with the magazine M. The raised portion 70F of the roller 70 has a plurality of radial suction openings 235 formed therein at spaced points throughout the entire area thereof, and with this arrangement, suction is applied to the openings 235 as these openings move into position over or opposite the right-hand end of the slot 232 as viewed in Fig. 4. Suction is applied to such openings until such openings pass beyond the lower or left-hand of the slot 232, thus to hold the label L in position on the raised portion 70F while the label is moved into contact with the magazine M. After the label has been pressed against the magazine M so as to adhere to the glue spot GS, the label must, of course, be released from the portion 70F of the roller 70, and this is brought about through the provision of a relief passage 236 that is formed in the valve body 70V so as to extend from a point just below the point of contact of the roll 70 with the magazine. The relief passage 236 extends in a counter-clockwise direction about the valve member to a point spaced slightly from the right-hand end of the slot 232. It will be noted that the relief passage 236 extends to the forward or right-hand edge of the valve body, as viewed in Fig. 7, thus to connect the aligned passages 235 to atmosphere. The upper portions of the valve member 70V, that is, those portions on opposite sides of the slot 232, about the ends of the slot 232, are arranged to bear against the internal surface of the rim 70R, thus to afford the proper control for the suction that is applied through the suction pipe 225.

*The timing of the label separating and affixing means*

It will be evident, of course, that the surface speed of the magazines M as they are moved through the label affixing position is much greater than the advancing speed of the mailing strip S, and in Figs. 11A, 11B and 11C, a diagrammatic showing is made of the way in which the label L is separated from the slowly advancing mailing strip and is thereafter advanced to label affixing position at an increased speed corresponding to the speed of movement of the magazine M. Thus, it will be evident that the roll 70 is driven at such a speed that it makes one revolution for each magazine M that passes the label affixing position, and the cutoff rolls 63 and 64 are driven in a one to one relationship with respect to the roll 70. When the mailing strip S moves from the pin wheel 61 and through the slotting rolls 63 and 64, the slot 210 is formed so as to extend in opposite directions from the perforation 180, and this leaves relatively narrow webs 210W adjacent to the opposite edges of the strip S. In the embodiment shown in Figs. 1 to 17, this slotting operation takes place only after the leading label L has been separated from the strip S, so that there is never more than one slot 210 present in the strip S at any time, and this enables the pin wheel 61 to serve as a holding or enclosing means for holding the second label while the leading label is separated therefrom. Independent holding means may, of course, be provided for holding the second label during the separating operation as will hereinafter be described in connection with the embodiment shown in Fig. 18.

In the form shown in Figs. 1 to 17, the single slot 210 forms the only possible point of separation when the leading label L is grasped by the rolls 70 and 71. In attaining this advantageous operation in the embodiment shown in Figs. 1 to 17, it is important that the distance between the bight of the rolls 70 and 71 and the bight of the rolls 63 and 64 be somewhat less than twice the length of the labels L. Thus, when the label L that is ahead of the previously formed slot 210 is passed between the rolls 70 and 71 and its speed of movement is increased rapidly, the webs 210W at the ends of the slot 210 are broken, as indicated at the left-hand portion of Fig. 6A of the drawings.

The clamping action between the rolls 70 and 71 takes place when the forward edge of the raised portion 70F comes into position where it forces the leading edge of the strip S against the resilient covering of the roll 71. Almost immediately after such clamping of the strip S between the rolls 70 and 71, with the resultant breaking of the leading label L from the strip S, suction is applied to the leading ones of the openings 235, and hence, the label is held against the projecting portion 70F and travels with the roll 70, as shown in Fig. 11B of the drawings. As this travel continues, the label is progressively forced against the glue spot GS, and below the line of contact between the roll 70 and the magazine, suction on the label is relieved so that the label L travels on with the magazine and in its properly affixed relationship.

*The delivery conveyor system*

After the label affixing operation has thus been completed, the magazine M continues its downward movement throughout the range of the clamping action of the belts 42, and at substantially the level of the lower pulleys 141 the magazine moves into contact with arcuate stripper members 250 which are disposed below the pulleys 141 so as to ride in circumferential slots 251 that are provided on opposite sides of certain of the belts 42, as shown in Figs. 3, 4, 5 and 14. These stripper members 250 direct the leading edge of the magazine away from the surface of the drum 40, and into a feed roller mechanism which deposits the magazine on the horizontal delivery conveyor 25. The horizontal delivery conveyor 25 is of the chain type having a drive sprocket 255, and this drive sprocket is driven from the gear 130. Thus, a gear 256 is meshed with the gear 130 and serves to drive a pinion 257. This pinion engages a gear 258 that forms an element of a closed gear, the other gear 259 of which is meshed with a gear 260 that is fixed on the axis of the sprocket 255 in a driving relationship.

The gear 256 also serves to drive the feed roll mechanism by which the magazines M are transferred from the strippers 250 to the delivery conveyor 25. Thus, the lower feed roll 262 is mounted on a stationary axis while an upper feed roll 263 is mounted on a shiftable arm structure 264 so as to be moved toward the lower feed roll 262. The structure 264 is pivoted on the axis of a shaft 265, and spring means 266 act on the rocking structure to urge the feed roll 263 toward the feed roll 262 and into a normal position determined by an adjustable stop 264S. The feed roll 262 has a drive pinion 267 affixed thereto and meshed with the gear 256. A pinion 268 fixed on the axis of the upper feed roll 253 is meshed with a gear 269 that is rotatable on the shaft 265, and a transmitting pinion 270 is interposed between the gears 269 and 267. Thus the feed rolls 262 and 263 are driven in opposite directions, and these feed rolls are so positioned as to grip the leading edge of the magazine M, in most instances, before the trailing edge thereof is discharged from the clamping action of the belts 42.

The clamping belts 42 are in the present instance driven from the lower feed roll 262, and for this purpose a pinion 262P is fixed on the shaft of the roll 262 so as to be driven with this roll. The pinion 262P is meshed with a transmitting gear 271 which is, in turn, meshed with a gear 272, and the gear 272 meshes with a gear 273 fixed on the shaft of the pulleys 141. Thus the belts 42 are driven at a speed substantially equal to the surface speed of the drum 40, and the magazines M are therefore clamped to the drum in such a way as to preserve the desired accuracy of positioning or registry of the magazines in respect to the drum.

The magazines M are thus deposited in succession upon the horizontal delivery conveyor 25, and as the magazine is deposited, the leading edge thereof moves into position beneath a relatively heavy and free-rolling pressure roll 275 that is pivoted on arms 276 that are carried on brackets 277 extended upwardly from the frame of the conveyor 25. The speed of the conveyor 25 is relatively slow as compared with the surface speed of the drum 40 so that the magazines M assume an overlapped or partially stacked relationship, as will be evident in Fig. 2 of the drawings. As the magazines M are advanced by the horizontal delivery conveyor 25, they are moved into the lower end of the elevating conveyor 26, the details of such elevating conveyor being illustrated in Figs. 12 and 13 of the drawings. As will be evident in Fig. 13, the output end of the conveyor 25 is such that the conveyor chains are extended about sprockets fixed on a horizontal shaft 280, and a take-up or tensioning sprocket 281 is in the present instance supported adjacent this end of the conveyor 25. The shaft 280 is thus driven and this shaft serves as a drive for the elevating conveyor 26. The elevating conveyor is in the form of a belt conveyor in which endless belts 282 are extended about lower pulleys fixed on the shaft 280, the upper ends of these belts being extended about pulleys fixed on a transverse shaft 285. These belts are maintained in a properly tensioned relationship by passing the lower run of the belts 282 about an idler pulley 287 and then upwardly and about a tensioning pulley 288, the belt then extending downwardly and about the lower pulleys carried on the shaft 280. The tensioning pulley 288 is mounted on a rocking structure 289 and is urged in an upward or tensioning direction by a spring 290. The belts 282 serve merely to engage the lower faces of the magazines and the magazines are held against the belts 282 by an upper clamping belt structure. This structure includes belts 292 that extend about upper and lower pulleys 293 and 294. The idle or upper runs of the belts 292 are extended about idler pulleys 295 and then about tensioning pulleys 296, such tensioning pulleys being mounted on a rocker arm structure 297 that is held under tension by a spring 298. Because of the clamping or holding functions of the belts 292, the upper and lower pulleys 293 and 294 are mounted for movement toward and away from the adjacent belts 282. Thus, the pulleys 294 are mounted on arms 300 and are urged toward the belts 282 by means including springs 301. Similarly, the pulleys 293 are mounted on arms 302 and are urged toward the belts 282 by a spring 303. In the intermediate portions of the belts 292, such belts are urged toward the belts 282 by means including rolls 305 and 306 that are respectively mounted on pivoted arms 307 and 308. The rolls 305 and 306 are arranged to urge by gravity toward their effective positions, and it will be observed that at points opposite these rollers 305 and 306, supporting rolls 309 and 310 are provided beneath the belts 282.

As the overlapped magazines M move toward the bight between the lower ends of the belts 282 and 292, they are caused to be guided into such bight by means including guide strips 312 that in the present instance are fixed on the mounting arms 300 which support the pulleys or rolls 294.

As shown in Figs. 12 and 13, the upper pulleys carried by the shaft 285 are driven in timed relation to the lower pulleys carried on the shaft 280, and for this purpose an endless drive chain 313 is extended about sprockets 314 and 315 fixed respectively on corresponding ends of the shafts 280 and 285. The upper shaft 285 is utilized as a drive source for the clamping conveyor 292, and for this purpose a pinion 317A is fixed on the shaft 285 and is meshed with an idler pinion 317B which in turn is meshed with a drive gear 317 that is loosely mounted on the pivot axis of the arms 302, and this gear 317 is meshed with a pinion 317C of the same pitch diameter as the pinion 317A that is fixed on the shaft 293S upon which the pulleys 293 are secured. Thus the pulleys 293 are driven at the same speed as the pulleys on the shaft 285, and the conveyor belts 282 and 292 are driven at the same speed.

As the magazines M are discharged from the upper ends of the elevating conveyor, they move into place on the final delivery table 27, this delivery table also embodying a conveyor that has belts 320. The belts 320 are mounted on the pulleys fixed on the shaft 285 so as to be driven thereby, and at the remote end of such belts they are extended about the pulleys 321. A tensioning pulley 322 is also provided, and the upper run of the belts 320 is supported intermediate the ends of the conveyor by a pulley or roller structure 323. At the point where the magazines are to be discharged onto the final delivery conveyor 320, a plurality of stripper arms 325 are positioned between the belts 292 and between the adjacent pulleys 293 so as to prevent the magazines from following the belts 292 as it turns about the pulleys 293.

At the end of the delivery table 27, an angular abutment wall 326 is provided in the path of the magazines M, and by reason of the overlapped relationship of the magazines M, the advancing movement of the magazines is effective to cause the magazines to assume substantially the stacked relationship as will be evident in Fig. 2 of the drawings.

*Use of labels having a liquid-soluble adhesive back coating*

The machine 20 hereinbefore described may be utilized to affix labels having a liquid-soluble or water-soluble adhesive back coating so that such labels are in effect what are usually termed gummed labels. When this is to be done the unit 50 serves as a conditioning unit rather than a spot-gluing unit, and is utilized to apply a spot of water or other solvent to the magazine M. Then when the gummed label is pressed against this spot, the liquid serves to soften the back coating and cause adherence of the label to the magazine.

*Use of labels having a pressure adhesive back coating*

When labels having a pressure adhesive back coating are to be affixed, the unit 50 may be removed from the machine, and the necessary pressure for causing adherence of the labels to the magazines is afforded by the spring pressed affixing roll 70.

Figure 19:
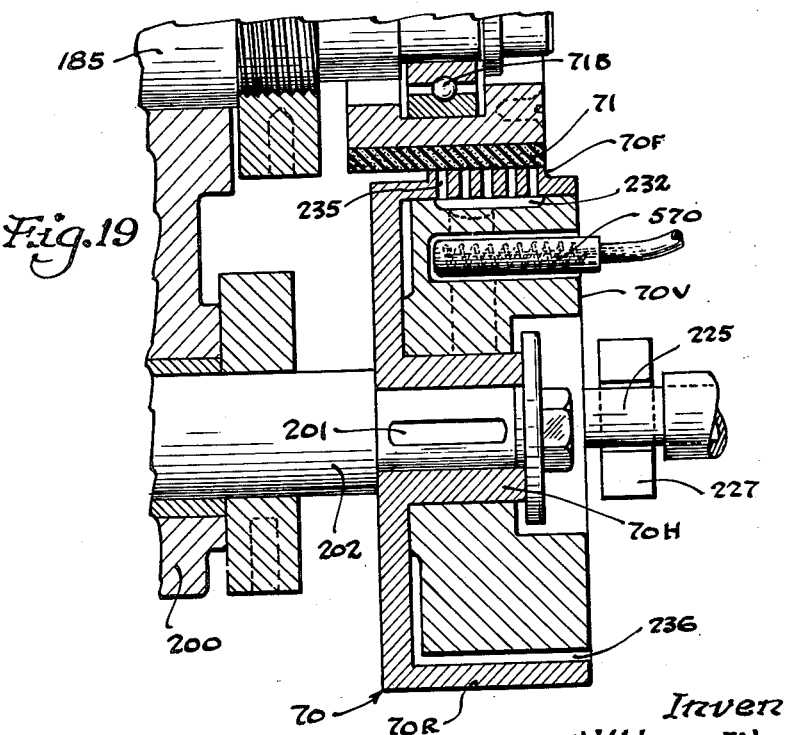
Fig. 19 is a view similar to Fig. 7 and showing another alternative construction.

*Use of labels having a back coating of heat-softened adhesive*

Where the labels have a back coating of heat-softened adhesive, the unit 50 is also removed, and heat is supplied in the label affixing zone by means such as an electric heater 570 that is inserted into the stationary valve member 70V, as shown in Fig. 19. This serves to heat the affixing roll 70 and the label carried thereby so that the back coating thereof will be softened to the extent required to produce adherence of the label to the magazine.

*The alternative embodiment of Fig. 18*

Under the present invention, a proper separation of the leading label in each cycle may also be attained in each instance even though the slots 210 are formed in the mailing strip in such a way that more than one such slot 210 is present in the strip as it approaches the label affixing station, and in Fig. 18 of the drawings, an alternative structure is illustrated whereby this may be accomplished. Thus, as shown in Fig. 18, the slotting rolls 63 and 64 are spaced more than two label lengths from the bight of the rolls 70 and 71. With the spacing shown, two slots 210 may be present at one time in the strip S, as indicated in Fig. 18, and the holding function in respect to the second label is performed by a pair of opposed driven feed rolls 563 and 564. These driven feed rolls 563 and 564 are preferably rubber covered and are driven at a surface speed corresponding to the surface speed of the feed wheel 61. Moreover, the feed rolls 563 and 564 are spaced from the bight of the rolls 70 and 71 in a distance somewhat less than two label lengths so that they will grip and retain the second label on the strip S as the leading label L is broken or separated therefrom at the first slot 210 that is located between the leading and second labels. Thus, the rolls 563 and 564 serve as holding means for the second label so as to prevent tearing or breaking of the strip at the second slot 210, thereby to assure that the forces applied to the leading label as its speed of movement is suddenly increased by the rolls 70 and 71 will cause proper separation of the leading label along the slot 210 at its trailing edge. This label separating arrangement of Fig. 18 may of course be utilized in the machine of Figs. 1 to 17, or as modified in Fig. 19, in applying labels of any of the kinds hereinbefore described.

From the foregoing description it will be apparent that the present invention materially simplifies and expedites the labeling of articles such as magazines for mailing and the like, and it has been found in practice that relatively large and heavy magazines may be labeled at a rate of over twenty thousand per hour, and that such output rate may be maintained hour after hour without the necessity of shutting down for cleaning or the like. It will also be evident that in the machine of the present invention the articles that are to be labeled, and the labels are maintained under accurate and positive control at all times so as to assure continuity of proper machine operation. Since the machine is fully rotary in character, apart from the suction feed structure, there are no speed limitations imposed upon the structure except by the suction feeder or article separating means.

It will also be evident that under the present invention a double feed where two magazines are passed through the machine at one time, does not cause breakage of the machine, the various cooperating elements being arranged to yield so as to compensate for the increased thickness, and one of the magazines will be labeled without stoppage of the machine. Thus in such instances no production time is lost.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:

1. In a machine of the character described, means for feeding all portions of a label strip with continuous motion endwise toward a separating station at a constant and relatively slow speed such that the strip is fed one label length in a predetermined time interval, means for feeding articles to be labeled past an affixing station at a higher speed such that one such article moves through said affixing station in each such time interval, severing means for partially severing said label strip into label lengths prior to the feeding of said label strip endwise toward said separating station, and means for separating the leading label from such a strip including a constantly rotating separating and transferring suction roll disposed so that its periphery extends past both of said stations and rotating at a surface speed substantially equal to said higher speed and greater than said slow speed whereby the leading label length is torn from said strip, said separating means being subsequently operable to press such label with a rolling action against such an article as the article moves at said higher speed through said affixing station, said severing means being separated from said separating means a distance greater than one label length but less than two label lengths.

2. In a machine of the character described, means for feeding a label strip with continuous motion endwise toward a separating station at a constant and relatively slow speed such that the leading end of the strip is fed one label length in a predetermined time interval, means for feeding articles to be labeled past an affixing station at a higher speed such that one such article moves through said affixing station in each such time interval, severing means for partially severing said label strip into label lengths prior to the feeding of said label strip endwise toward said separating station, and means for separating the leading label from such a strip including a constantly rotating separating and transferring roll having label holding means thereon in the form of section ports and disposed so that its periphery extends past both of said stations and rotating at a surface speed equal to said higher speed and greater than said slow speed whereby the leading label length is torn from said strip and operable to press such label with a rolling action against such an article as the article moves at said higher speed through said affixing station, said severing means being separated from said separating means a distance greater than one label length but less than two label lengths.

3. In a machine for separating and affixing labels, means for feeding such a label strip endwise toward a separating station at a relatively slow speed such that the leading end of the strip is fed one label length in a predetermined time interval, means for feeding articles to be labeled past an affixing station at a higher speed such that one such article moves through said affixing station in each such time interval, means for separating the leading label from such a strip including a constantly rotating separating and transfering roll having label holding means associated therewith and disposed so that its periphery extends past both of said stations and rotating at a surface speed equal to said higher speed and operable to press such label with a rolling action against such an article as the article moves at said higher speed through said affixing station, said label holding means being in the form of suction means operative to apply suction to the leading label of said strip as the same advances on to the transferring roller and operative to release said suction as such label is pressed with a rolling action against an article at the affixing station.

4. In a machine of the character described, a constantly rotating label-applying roll having a raised perforated segmental face portion upon which a label may be carried along a predetermined arcuate path from a separating position to an affixing position, a gripping roll opposed to said label-applying roll at said separating position for cooperation therewith in gripping the leading edge of a label strip, valved suction means connected to said perforated segmental portion of said roll for applying suction to said face to hold a label on said face while said face moves along said arcuate path, means for feeding all portions of such a strip with a constant and uniform motion toward said separating position and into the bight between said rolls at a low speed less than the surface speed of said label-applying roll and such that the strip is continuously advanced one label length each time said face portion passes said separating position, means for acting on such a strip at a distance of less than two label lengths but more than one from the bight of said rolls to hold the second label of the strip when the gripping of the leading label by said rolls applies forward separating forces to the leading label of the strip, and means for feeding articles past said label-applying roll at the same surface speed as said roll and in rolling contact therewith and at a rate such that one such article passes said affixing position whenever a label is moved into such station by said label-applying roll.

5. In a machine of the character described, a constantly rotating label-applying roll having a label holding means thereon whereby a label may be carried along a predetermined arcuate path from a separating position to an affixing position, a gripping roller opposed to said label-applying roll at said separating position for cooperation therewith in gripping the leading edge of a label strip, means for feeding all portions of such a strip, with a constant and uniform motion toward said separating position and into the bight between said rolls at a low speed less than the surface speed of said label-applying roll and such that the strip is continuously advanced one label length each time said label holding means passes said separating position, means for acting on such a strip at a distance of less than two label lengths but more than one from the bight of said rolls to hold the second label of the strip when the gripping of the leading label by said rolls applies forward separating forces to the leading label of the strip, and means for feeding articles past said label-applying roll at the same surface speed as said roll and in rolling contact therewith and at a rate such that one such article passes said affixing position whenever a label is moved into such station by said label-applying roll.

6. In a label separating and affixing machine, label gripping means for gripping the leading edge of a label strip and including a constantly rotating label-applying roll having label holding means in the form of suction openings for holding a label of said roll while it moves along an arcuate path between a separating station and an affixing station, means for feeding all portions of such a strip with a constant and uniform motion toward said separating station and into cooperation with said label gripping means at a low speed less than the surface speed of said label-applying roll and such that the strip is continuously advanced one label length each time said holding means passes said separating station, means for acting on such a strip at a distance of less than two label lengths but more than one from the bight of said separating station to hold the second label of the strip when said separating means applies forward separating forces to the leading label of the strip, and means for feeding articles past said label-applying roll at said affixing station at the same surface speed as said roll and in rolling contact therewith and at a rate such that one such article passes said affixing station whenever a label is moved into such station by said label-applying roll.

7. In a machine of the character described in which a predetermined time interval constitutes a machine cycle, means for feeding articles one by one through said label affixing station at a predetermined high speed such that one article passes through said label affixing station in each machine cycle, means for continuously feeding the end of a label strip in an advancing direction toward said label affixing station at a low speed less than said predetermined high speed and such that the label strip is advanced one label length in each machine cycle, suction label-separating and affixing means operable to grasp by suction the leading label of said strip and, by movement of said leading label in said advancing direction at a speed greater than said low speed, to separate the leading label from said strip, said label separating and affixing means being thereafter operable to carry and press the separated label onto an article as it moves at such high speed through said affixing station, and label severing means toward which said constantly fed end of the label strip is continuously advanced including means to partially sever said label strip into label lengths prior to the time that said affixing means are operable to grasp the leading label of said strip, said means to partially sever the label strip being spaced from said label separating and affixing means a distance greater than one label length but less than two label lengths.

8. In a machine of the character described in which a predetermined time interval constitutes a machine cycle, a rotatable carrier drum having a plurality of mounting lugs thereabout in equally spaced relation for feeding articles one by one through a label affixing station at a predetermined high speed such that one article passes through said label affixing station in each machine cycle, means for feeding articles one by one into the respective mounting positions on said drum at a speed greater than the speed of said carrier drum, means for continuously feeding the end of a label strip in an advancing direction toward said label affixing station at a low speed less than said predetermined high speed and such that the label strip is advanced one label length in each machine cycle, label-separating and affixing means operable to grasp the leading label of said strip and by movement of said leading label in said advancing direction at a speed greater than said low speed, to separate the leading label from said strip, said label separating and affixing means being thereafter operable to press the separated label onto an article as it moves through said affixing station, and label severing means toward which said constantly fed end of the label strip is continuously advanced including means to partially sever said label strip into label lengths prior to the time said affixing means are operable to grasp the leading label of said strip, said means to partially sever the label strip being spaced from said label separating and affixing means a distance greater than one label length but less than two label lengths.

9. In a machine of the character described in which a predetermined time interval constitutes a machine cycle, a rotatable carrier drum having a plurality of fixed mounting positions thereabout in equally spaced relation for feeding articles one by one past a label affixing station at a predetermined high speed such that one article passes through said label affixing station in each machine cycle, means for feeding articles one by one into the respective mounting positions on said drum at a speed greater than the speed of said drum, means for continuously feeding the end of a label strip in an advancing direction toward said label affixing station at a low speed less than said predetermined speed and such that the label strip is advanced one label length in each machine cycle, label-separating and affixing means operable to grasp the leading label of said strip and by movement of said leading label in said advancing direction at a speed greater than said low speed, to separate the leading label from said strip and to thereafter press the separated label into an article as it moves through said affixing station, and label severing means toward which said continuously fed end of the label strip is advanced including means to partially sever said label strip into label lengths prior to the time said affixing means are operable to grasp the leading label of said strip, said means to partially sever the label strip being spaced from said label separating and affixing means a distance greater than one label length but less than two label lengths.

10. In a label handling mechanism having an article carrier adapted to transport articles to be labeled to a label affixing station, a suction roller in the label affixing station having a segmental projecting gripping surface having suction openings therein, means rotatably supporting said suction roller, driving means for said suction roller, a pressure roller opposed to said suction roller to afford a bight between such rollers into which the end of a label strip may be fed for gripping between the pressure roller and said gripping surface, a positive strip feeding means operable in timed relation to said suction roller to feed a strip toward said bight at a rate such that such strip advances one label-length for each rotation of said suction roller, severing means located between said bight and said feed means for forming weakening slots between successive labels of the strip, holding means spaced from said bight in a distance more than one label length and less than two label lengths and being driven in timed relation to said feeding means to hold the second label during separation of the first label therefrom, and valve means operable to supply suction to said gripping surface while said gripping surface moves between said pressure roller and another point about the axis of the suction roller opposite said carrier and to then release such suction whereby the label is applied to the corresponding article on the carrier.

11. In a label handling mechanism having an article carrier adapted to transport articles to be labeled to a label affixing station, a suction roller in the label affixing station having a segmental projecting gripping surface having suction openings therein, means rotatably supporting said suction roller immediately contiguous the surface of said article carrier so that the article carrier and suction roller advance together in a forward direction, driving means for said suction roller, a pressure roller opposed to said suction roller to afford a bight between such rollers into which the end of a label strip may be fed for gripping between the pressure roller and said gripping surface, a positive strip feeding means operable in timed relation to said suction roller to feed a strip toward said bight at a rate such that such strip advances one label-length for each rotation of said suction roller, severing means located between said bight and said feed means for forming weakening slots between successive labels of the strip, said severing means being driven in timed relation to said feeding means to effect its weakening severing action shortly after the leading edge of the strip has been gripped between said rollers, and valve means operable to apply suction to said gripping surface while said gripping surface moves between said pressure roller and another point about the axis of the suction roller opposite said carrier and to then release such suction whereby the label is applied to the corresponding article on the carrier.

12. In a mailing machine for separating mailing labels one by one from a mailing strip and affixing such labels to magazines or the like, a rotatable carrier drum, a plurality of longitudinally extended positioning abutments on the periphery of said drum to define and locate the respective leading edges of a plurality of mounting positions on the drum, means for feeding magazines one at a time into the successive mounting positions on the drum and into engagement with the abutments at the leading edges of said positions, said means for feeding magazines being operated at a speed greater than the speed of said drum, a positive mailing strip feeding means operable in timed relation to said drum to feed a mailing strip toward a label affixing station that is located in a subsequent portion of said zone at a rate such that such strip advances one label-length for each mounting position that passes said affixing station, a rotatable suction wheel and an opposed pressure roller, means for driving said wheel and roller at a surface speed equal to the surface speed of said drum, said suction wheel being positioned to carry a label into adhering contact with a magazine as it passes through said affixing station, said strip feeding means being operable to feed the leading end of the strip into the bight between said roller and said suction wheel, and severing means located between said bight and said strip feeding means for forming weakening slots between successive labels of the strip.

13. In a mailing machine for separating mailing labels one by one from a mailing strip and affixing such labels to magazines or the like, a rotatable carrier drum, means defining a plurality of mounting positions on the periphery of said drum, means for feeding magazines one at a time into the successive mounting positions on the drum at a speed greater than the speed of said drum, a rotatable suction wheel and an opposed pressure roller driven in timed relation and in a direction opposite to said drum and at a surface speed equal to the surface speed of said drum and positioned to carry a label into adhering contact with a magazine as it passes through a label affixing station located in a succeeding portion of said zone, a positive strip feeding means operable to feed the leading end of the strip into the bight between said roller and said suction wheel and operated at a rate such that the strip advances one label-length for each mounting position that moves past said affixing station, cutting means located between said bight and said feed means for forming weakening slots between successive labels of the strip and said cutting means being spaced from said bight in a distance more than one label-length and less than two label-lengths, and means driving said cutting means in timed relation to said strip feeding means to effect its weakening cutting action shortly after gripping of the leading edge of the strip between said suction wheel and said pressure roller has separated the leading label from the strip.

14. In a label affixing machine for separating labels one by one from a label strip and affixing the separated labels in succession to articles fed through the machine in succession along a predetermined path and at a predetermined speed, a suction roller having a segmental projecting gripping surface having suction openings therein, means supporting said suction roller on a rotative axis transverse to said path and so spaced therefrom that said gripping surface will have a line of rolling engagement with the adjacent face of an article moving along said path in said direction, driving means for said suction roller operable to drive said suction roller with a peripheral surface speed equal to said predetermined speed and in a selected direction such that the side of said roller that is adjacent to said path moves in the same direction as such articles, a pressure roller opposed to said suction roller at another side of said suction roller to afford a bight between such rollers into which the end of a label strip may be fed for gripping between the pressure roller and said gripping surface, a positive strip feeding means operable in timed relation to said suction roller to feed a strip toward said bight at a rate such that such strip advances one label-length for each rotation of said suction roller, severing means located between said bight and said feed means for forming weakening slots between successive labels of the strip, said severing means being spaced from said bight in a distance more than one label-length and less than two label-lengths and being driven in timed relation to said feeding means to effect its weakening severing action shortly after the leading edge of the strip has been gripped between said rollers, and valve means operable to apply suction to said gripping surface while said gripping surface moves between said pressure roller and said line of rolling engagement and to then release such suction.

15. In a label affixing machine for separating labels one by one from a label strip and affixing the separated labels in succession to articles fed through the machine in succession along a predetermined path and at a predetermined speed, a suction roller having a gripping surface having suction openings therein, means supporting said suction roller on a rotative axis transverse to said path and so spaced therefrom that said gripping surface will have a line of rolling engagement with the adjacent face of an article moving along said path in said direction, driving means for said suction roller operable to drive said suction roller with a peripheral surface speed equal to said predetermined speed and in a selected direction such that the side of said roller that is adjacent to said path moves in the same direction as the articles, a pressure roller opposed to suction roller at another side of said suction roller to afford a bight between such rollers into which the end of a label strip may be fed for gripping between the pressure roller and said gripping surface, a positive strip feeding means operable in timed relation to said suction roller to feed a strip toward said bight at a rate such that such strip advances one label-length for each rotation of said suction roller, severing means located between said bight and said feed means for forming weakening slots between successive labels of the strip and operating in timed relation to said feeding means to effect its weakening severing action at the trailing edge of the leading label shortly after the preceding label has been separated from the strip, and valve means operable to apply suction to said gripping surface while said gripping surface moves between said pressure roller and said line of rolling engagement and to then release such suction.

16. In a label separating and affixing machine, a first means for feeding articles to be labeled at a relatively high speed one by one through a label affixing station in the machine, means for continuously feeding a label strip to be separated into individual label lengths in an advancing direction toward said affixing station and at a predetermined slow speed, said affixing station including a roller arranged for constant rotation contiguous the feeding path of said articles through the affixing station, said roller being disposed in the feeding path of said label strip whereby said label strip is constantly fed on to the periphery of said roller, suction means rotating with said roller to grip the leading end of said strip and advance the same into rolling contact with one of said articles passing through said affixing station while holding said leading end of the strip on to the periphery of said roller, said roller being arranged for rotation at a speed greater than said predetermined slow speed whereby a bursting action is applied to said leading end of said strip such that individual label lengths may first be separated from said strip and then applied one by one to said articles by said suction means rotating with said roller as the articles advance one by one through said affixing station, means for disabling the suction means as a label length is applied by said roller to one of said articles passing through the affixed station, and a holding means disposed along the feeding path of said label strip rearwardly of said affixing station to apply a holding action on the label strip to facilitate said bursting action.

17. In a label separating and affixing machine, a first means for feeding articles to be labeled at a relatively high speed one by one through a label affixing station in the machine, means for continuously feeding a label strip to be separated into individual label lengths in an advancing direction toward said affixing station and at a predetermined slow speed, said affixing station including a roller arranged for constant rotation contiguous the feeding path of said articles through the affixing station, said roller being disposed in the feeding path of said label strip so that the leading end of said label strip is constantly fed on to the periphery of said roller, a second roller rotatably supported in opposed relation to the first named roller and defining therewith a bight for gripping the leading end of said strip to advance said leading end into rolling contact with one of said articles passing through said affixing station, said rollers together being rotated at a surface speed greater than said predetermined slow speed whereby a bursting action is applied to the leading end of said strip such that individual label lengths may first be separated from said strip and then applied one by one to said articles by said rollers as the articles advance one by one through said affixing station, and a holding means disposed along the feeding path of said label strip rearwardly of said affixing station to apply a holding action on the label strip in opposed relation to the action of said rollers to thereby facilitate said bursting action, said holding means being located a distance from said rollers that is at least greater than one label length.

18. In a label separating and affixing machine, a first means for feeding articles to be labeled at a relatively high speed one by one through a label affixing station in the machine, means for continuously feeding a label strip to be separated into individual label lengths in an advancing direction toward said affixing station and at a predetermined slow speed, said affixing station including a roller arranged for constant rotation contiguous the feeding path of said articles through the affixing station, said roller being disposed in the feeding path of said label strip so that the leading end of said label strip is constantly fed on to the periphery of said roller, a second roller rotatably supported in opposed relation to the first named roller and defining therewith a bight for gripping the leading end of said strip to advance said leading end into rolling contact with one of said articles passing through said affixing station, said rollers together being rotated at a surface speed greater than said predetermined slow speed whereby a bursting action is applied to the leading end of said strip such that individual label lengths may first be separated from said strip and then applied one by one to said articles by said rollers as the articles advance one by one through said affixing station, said first-named roller being provided with suction applying means and suction ports leading to the outer surface of the first-named roller for applying suction to the separated label lengths to hold the same on the periphery of the first-named roller until rolling contact is made with a corresponding one of said articles, means to release said vacuum as a label length is rolled progressively on to a corresponding one of said articles by the action of the first-named roller, and a holding means disposed along the feeding path of said label strip rearwardly of said affixing station to apply a holding action on the label strip to resist the action of said rollers and to thereby facilitate said bursting action.

19. In a label separating and affixing machine, a first means for feeding articles to be labeled at a relatively high speed one by one through a label affixing station in the machine, means for continuously feeding a label strip to be separated into individual label lengths in an advancing direction toward said affixing station, said affixing station including a pair of engaged rollers rotatably supported contiguous the feeding path of said articles and arranged to have a rotative surface speed corresponding to said relatively high speed, the bight between said rollers being aligned with the feeding path of said label strip such that the leading end of the label strip is gripped between said rollers and advanced thereby at said relatively high speed toward the path of said articles advancing through the affixing station, means disposed rearwardly of said affixing station and along the feeding path of said label strip to apply holding action on the label strip in opposed relation to the advancing action of said rollers whereby said rollers are effective to burst the leading end of the label strip to separate a label length therefrom, and means carried by the roller which rotates in the direction corresponding to the direction of said articles through the affixing station to hold the thus-separated label length on the periphery thereof and carry the same into rolling contact with a corresponding one of said articles advancing through the affixing station.

20. In a label separating and affixing machine, article feed means for advancing articles to be labeled one by one past a pair of engaged rollers arranged at an affixing station in the machine for a rotative surface speed equal to the speed of said article feed means, one of said rollers being arranged to rotate in a direction such that individual label lengths carried on the periphery thereof may be affixed one by one on to the corresponding articles advancing past said one roller, strip feed means for advancing a label strip to be separated into individual label lengths toward said engaged rollers such that the leading end of the strip passes between the bight of the rollers and is advanced thereby at a speed equal to said rotative speed toward the articles moving through said affixing station, holding means removed rearwardly of said affixing station in position to apply a holding action to the label strip so that the portion of the strip corresponding to the holding means is held stationary and said leading end of the strip thereupon separated in the form of an individual label length by the simultaneous action of said rollers and holding means, and means carried by said one roller to hold the thus-separated label length on the periphery thereof until the label is carried by said one roller into rolling contact with a corresponding one of the articles moving through the affixing station.

21. In a label separating and affixing machine, article feed means for advancing articles to be labeled one by one past a pair of engaged rollers arranged at an affixing station in the machine for rotation at a surface speed equal to the speed of said article feed means, one of said rollers being arranged to rotate in a direction such that individual label lengths carried on the periphery thereof may be affixed one by one on to the corresponding articles advancing past said one roller, strip feed means for advancing a label strip to be separated into individual label lengths toward said engaged rollers such that the leading end of the strip passes between the bight of the rollers and is advanced thereby at a speed equal to said rotative speed toward the articles moving through said affixing station, holding means removed rearwardly of said affixing station in position to apply holding action to the label strip to resist the advancing action of said engaged rollers on said label strip so that label lengths are thereby separated from the strip at the leading end thereof by the simultaneous action of said rollers and holding means, said one roller being provided with an internal suction means and suction ports opening at the periphery, said suction ports being open during the time that a label length is being separated from the leading end of the label strip and remaining open until such label length is rolled into contact with a corresponding article to be labeled, and means for closing off said suction ports when said rolling contact is established.

22. In a label separating and affixing machine, an article feed means for feeding articles to be labeled at a relatively high speed one by one through a label affixing station in the machine, means for continuously feeding a label strip to be separated into individual label lengths in an advancing direction toward said affixing station and at a predetermined slow speed, said affixing station including a roller arranged for constant rotation contiguous the feeding path of said articles through the affixing station, said roller being disposed in the feeding path of said label strip whereby said label strip is constantly fed on to the periphery of said roller, suction means rotating with said roller to grip the leading end of said strip and advance the same into rolling contact with one of said articles passing through said affixing station while holding said leading end of the strip on to the periphery of said roller, said roller being arranged for rotation at a speed greater than said predetermined slow speed whereby a bursting action is applied to said leading end of said strip such that individual label lengths may first be separated from said strip and then applied one by one to said articles by said suction means rotating with said roller as the articles advance one by one through said affixing station, means for disabling the suction means as a label length is applied by said roller to one of said articles passing through the affixing station, and a holding means disposed along the feeding path of said label strip rearwardly of said roller a distance greater than one label length but less than two label lengths for applying a holding action on the label strip at a point beyond the leading label length to facilitate said bursting action.

23. In a label separating and affixing machine, an article feed means for advancing articles to be labeled one by one at a predetermined speed into and through a label affixing station in the machine, said label affixing station including a roller arranged to rotate immediately contiguous the path of said articles advancing through said station and in a direction so as to locate labels one by one on to a predetermined location on said articles, means for advancing a label strip to be separated into individual label lengths in a forward direction toward said roller and to continuously feed the leading end of said label strip on to said roller, suction means operative first to hold said leading end of the label strip down on the periphery of said roller as the leading end passes on to said roller and to prevent slippage of said leading end on said roller, and holding means removed a distance greater than one label length but less than two label lengths from said roller in position to apply restraining actions to said label strip such that the leading label only is separated from the strip by the slippage-preventing action of the suction means, said suction means being operative thereafter to hold the thus-separated label length on to the periphery of said roller until said label length is carried into rolling contact with a corresponding one of said articles passing through said label affixing station whereupon the suction means are rendered inoperative.

24. In a label separating and affixing machine, an article feed means for feeding articles to be labeled at a relatively high speed one by one through a label affixing station in the machine, said article feed means including a movable carrier having fixed elements spaced at regular intervals thereon against which the articles to be labeled are to be positioned, means for feeding articles to be labeled on to said carrier in timed relation to but at a greater speed than said carrier whereby said articles are accurately thrust one by one against said elements to be carried to the label affixing station, means for continuously feeding a label strip to be separated into individual label lengths in an advancing direction toward said affixing station and at a predetermined slow speed, said affixing station including a roller arranged for constant rotation contiguous the feeding path of said articles through the affixing station, said roller being disposed in the feeding path of said label strip whereby said label strip is constantly fed on to the periphery of said roller, suction means rotating with said roller to grip the leading end of said strip and advance the same into rolling contact with one of said articles passing through said affixing station while holding said leading end of the strip on to the periphery of said roller, said roller being arranged for rotation at a speed greater than said predetermined slow speed whereby a bursting action is applied to said leading end of said strip such that individual label lengths may first be separated from said strip and then applied one by one to said articles by said suction means rotating with said roller as the articles advance one by one through said affixing station, means for disabling the suction means as a label length is applied by said roller to one of said articles passing through the affixing station, and a holding means disposed along the feeding path of said label strip rearwardly of said roller a distance greater than one label length but less than two label lengths for applying a holding action on the label strip at a point beyond the leading label length to facilitate said bursting action.

25. In a label separating and affixing machine, an article feed means for advancing articles to be labeled one by one at a predetermined speed into and through a label affixing station in the machine, said article feed means including a movable carrier having fixed elements spaced at regular intervals thereon against which the articles to be labeled are to be positioned, means for feeding articles to be labeled on to said carrier in timed relation to but at a greater speed than said carrier whereby said articles are accurately thrust one by one against said elements to be carried to the label affixing stations, said label affixing station including a roller arranged to rotate immediately contiguous the path of said articles advancing through said station and in a direction so as to locate labels one by one on to a predetermined location on said articles, means for advancing a label strip to be separated into individual label lengths in a forward direction toward said roller and to continuously feed the leading end of said label strip on to said roller, suction means operative first to hold said leading end of the label strip down on the periphery of said roller as the leading end passes on to said roller and to prevent slippage of said leading end on said roller, and holding means removed a distance greater than one label length but less than two label lengths from said roller in position to apply restraining actions to said label strip such that the leading label only is separated from the strip by the slippage-preventing action of the suction means, said suction means being operative thereafter to hold the thus-separated label length on to the periphery of said roller until said label length is carried into rolling contact with a corresponding one of said articles passing through said label affixing station whereupon the suction means are rendered inoperative.

26. In a label separating and affixing machine, article feed means for advancing articles to be labeled one by one at a predetermined speed into and through a label affixing station in the machine, said label affixing station including a roller arranged to rotate immediately contiguous the path of said articles advancing through said station and in a direction so as to locate labels one by one on to a predetermined location on said articles, means for advancing a label strip to be separated into individual label lengths in a forward direction toward said roller and to continuously feed the leading end of said label strip on to said roller, suction means operative first to hold said leading end of the label strip down on the periphery of said roller as the leading end passes on to said roller and to prevent slippage of said leading end on said roller, holding means removed a predetermined distance from said station in position to apply restraining actions to said label strip such that the leading end of the label is separated from the strip by the slippage-preventing action of the suction means, said suction means being operative thereafter to hold the thus-separated label length on to the periphery of said roller until said label length is carried into rolling contact with a corresponding one of said articles passing through said label affixing station whereupon the suction means are rendered inoperative.

References Cited in the file of this patent

UNITED STATES PATENTS

| Number | Name | Date |
| --- | --- | --- |
| 1,206,345 | McMillan | Nov. 28, 1916 |
| 1,949,152 | Fankboner | Feb. 27, 1934 |
| 2,050,457 | Ohlsen et al. | Aug. 11, 1936 |
| 2,055,508 | Simon | Sept. 29, 1936 |
| 2,170,068 | Taylor et al. | Aug. 22, 1939 |
| 2,252,733 | Sherman et al. | Aug. 19, 1941 |
| 2,380,949 | Davidson | Aug. 7, 1945 |
| 2,449,298 | Hoppe | Sept. 14, 1948 |
| 2,471,447 | Perkins | May 31, 1949 |
| 2,472,931 | Yohn | June 14, 1949 |
| 2,483,458 | Fischer et al. | Oct. 4, 1949 |
| 2,512,414 | Booth et al. | June 20, 1950 |
| 2,525,741 | Von Hofe | Oct. 10, 1950 |
| 2,606,681 | Ridenour | Aug. 12, 1952 |